United States Patent
Struye et al.

(10) Patent No.: US 7,186,996 B2
(45) Date of Patent: Mar. 6, 2007

(54) SYSTEM FOR READING OUT STORAGE PHOSPHOR SCREENS

(75) Inventors: Luc Struye, Mortsel (BE); Luc Vanmaele, Lochristi (BE); Paul Leblans, Kontich (BE)

(73) Assignee: AGFA-Gevaert, Mortsel (BE)

( * ) Notice: Subject to any disclaimer, the term of this patent is extended or adjusted under 35 U.S.C. 154(b) by 277 days.

(21) Appl. No.: 10/913,955

(22) Filed: Aug. 6, 2004

(65) Prior Publication Data

US 2006/0027770 A1  Feb. 9, 2006

(51) Int. Cl.
  *G03B 42/08* (2006.01)
(52) U.S. Cl. .................. 250/586; 250/581
(58) Field of Classification Search ........... 250/581, 250/582, 584, 585, 586, 588, 363.01, 363.02
  See application file for complete search history.

(56) References Cited

U.S. PATENT DOCUMENTS

| | | | | |
|---|---|---|---|---|
| 3,859,527 A * | 1/1975 | Luckey | ............ | 250/581 |
| 4,386,364 A * | 5/1983 | Shimada | ............ | 348/796 |
| 5,547,807 A * | 8/1996 | Leblans et al. | ............ | 430/139 |
| 5,814,831 A * | 9/1998 | Verbeke | ............ | 250/586 |
| 5,905,014 A * | 5/1999 | Van de Bergh | ............ | 430/139 |
| 5,986,279 A * | 11/1999 | Dewaele | ............ | 250/582 |
| 6,495,850 B1 * | 12/2002 | Struye et al. | ............ | 250/586 |
| 6,512,240 B1 * | 1/2003 | Leblans et al. | ............ | 250/588 |
| 6,528,812 B1 * | 3/2003 | Leblans et al. | ............ | 250/588 |
| 6,784,448 B2 * | 8/2004 | Neriishi et al. | ............ | 250/584 |
| 6,800,870 B2 * | 10/2004 | Sayag | ............ | 250/584 |
| 6,969,007 B2 * | 11/2005 | Stahl et al. | ............ | 235/491 |
| 6,998,633 B2 * | 2/2006 | Stahl | ............ | 250/589 |
| 2001/0035506 A1 * | 11/2001 | Tavernier et al. | ............ | 250/584 |
| 2003/0160186 A1 * | 8/2003 | Van den Bergh et al. | ............ | 250/484.4 |
| 2004/0124379 A1 * | 7/2004 | Yasuda | ............ | 250/584 |
| 2006/0029948 A1 * | 2/2006 | Lim et al. | ............ | 435/6 |
| 2006/0030738 A1 * | 2/2006 | Vanmaele et al. | ............ | 268/9 |

* cited by examiner

*Primary Examiner*—Otilia Gabor
*Assistant Examiner*—Faye Boosalis
(74) *Attorney, Agent, or Firm*—Joseph T. Guy; Nexsen Pruet, LLC

(57) ABSTRACT

A system has been described for reading out stimulable phosphor screens, plates or panels, whether or not differing from each other in phosphor composition or phosphor layer arrangement, after exposing said screens to X-rays. Said system comprises at least one source of stimulating radiation, an array of transducer elements arranged for detecting light emitted upon stimulation and for converting said light into a signal representation of said image. Said system further comprises filtering means for preventing light, emitted by said source of stimulation light, from being detected by said transducer elements, wherein said filtering means transmits light with a high transmission efficiency for emitted blue light upon stimulation and low transmission for radiation from the stimulating laser source.

35 Claims, 4 Drawing Sheets

SYSTEM FOR READING OUT STORAGE PHOSPHOR SCREENS

FIELD OF THE INVENTION

The present invention relates to a system for reading out a plurality of storage phosphor plates. More particularly errors in the handling of said storage phosphor plates, having been exposed and processed in an at random order in a radiographic environment, are avoided thereby as light emitted by said plurality of phosphor screens, upon stimulation, is effectively separated from stimulation light.

BACKGROUND OF THE INVENTION

Opposite to conventional radiography wherein an intensifying luminescent phosphor screen directly emits luminescent radiation and wherein said screen is not a storage medium, radiation image recording and reproducing techniques utilizing a radiation image storage panel, referred to as the stimulable phosphor screen, sheet or panel, are provided with a stimulable phosphor. With radiation image recording and reproducing techniques, the stimulable phosphor of the radiation image storage panel is caused to absorb radiation, which carries image information of an object or which has been radiated out from a sample. Said stimulable phosphor is exposed to stimulating rays, such as visible light or infrared rays, which causes the stimulable phosphor to emit light in proportion to the amount of energy stored thereon during its irradiation exposure.

The emitted fluorescent light is then photoelectrically detected in order to obtain an electric signal. The electric signal is further processed, and the processed electric signal is utilized for reproducing a visible image on a recording material. This way of working, making use of storage phosphor sheets or panels as an intermediate storage medium is also called "computed radiography".

As in radiography it is important to have excellent image quality for the radiologist to make an accurate evaluation of a patient's condition, important image quality aspects are image resolution and image signal-to-noise ratio.

For computed radiography signal-to-noise ratio depends on a number of factors.

First, the number of X-ray quanta absorbed by the storage phosphor screen is important. Signal-to-noise ratio will be proportional to the square-root of the number of absorbed quanta.

Second, the so-called fluorescence noise is important. This noise is caused by the fact that the number of photostimulated light (PSL) quanta detected for an absorbed X-ray quantum is small. Since a lot of the PSL light is lost in the detection process in computer radiography, fluorescence noise has an important contribution to the signal-to-noise ratio. It is important that, on the average, at least 1 photon is detected for every absorbed X-ray quantum. If this is not the case, many absorbed X-ray quanta will not contribute to the image and signal-to-noise ratio will be very poor.

This situation is most critical in mammography, where X-ray quanta are used with low energy. Softer X-rays will give rise to less PSL centres and, therefore, to less PSL photons than harder X-rays.

In computed radiography, a number of PSL centres are created by the absorbed X-ray quanta. Not all PSL centres are stimulated in the read-out process, because of the limited time available for pixel stimulation and because of the limited laser power available. In practice, only about 30% of the PSL centres is stimulated to give rise to a PSL photon. Since these photons are emitted and scattered in all directions, only 50% of the PSL photons are emitted at the top side of the storage phosphor screen, where they can be detected by the detection system. The emitted PSL photons are guided towards the detector by a light guide. This light guide may consist of an array of optical fibres, that forms rectangular detection area above the storage phosphor screen and has a circular cross-section at the detector side. This type of light guide has a numerical aperture of only 30%, which means that only 1 out of 3 of the emitted PSL photons is guided to the detector. In between the light guide and the detector a filter is placed, which stops the stimulation light reflected by the storage phosphor screen and transmits the PSL light emitted by the screen. This filter also has a small absorption and reflection of PSL light and transmits only ca. 75% of the PSL photons. In computed radiography a photomultiplier is commonly used to transform the PSL signal into an electric signal. At 440 nm the photomultiplier has a quantum efficiency of ca. 20%. This means that only 1 out of 5 PSL quanta that reach the photomultiplier are detected.

In summary, for 1,000 PSL centres that are created in the storage phosphor screen, only 1,000×0.3×0.5×0.3×0.75×0.2 or 6.75 PSL photons are detected. If it is required that every X-ray quantum gives rise to at least 1 detected PSL photon, therefore, the number of PSL centres created by an X-ray quantum should be sufficiently large. Or, conversely, the X-ray energy required to create a PSL-centre should be sufficiently small.

In mammography, a common setting of the X-ray source is at 28 kVp. This leads to an X-ray spectrum, where the average energy of an X-ray quantum is of the order of 15 keV. For an X-ray quantum with this energy, in order to give rise to at least 1 detected PSL photon, the energy needed to create a PSL centre should be less than 15,000×6.75/1,000=100 eV.

Further it is well-known that fine detail visualization, high-resolution high-contrast images are required for many X-ray medical imaging systems and particularly in mammography. The resolution of X-ray film/screen and digital mammography systems is currently limited to 20 line pairs/mm and 10 line pairs/mm, respectively. One of the key reasons for this limitation is associated with the phosphor particle size in the currently used X-ray screens.

In particular, light scattering by the phosphor particles and their grain boundaries results in loss of spatial resolution and contrast in the image. In order to increase the resolution and contrast, scattering of the visible light must be decreased. Scattering can be decreased by reducing the phosphor particle size while maintaining the phosphor luminescence efficiency. Furthermore, the X-ray to light conversion efficiency, the quantum detection efficiency (e.g. the fraction of absorbed X-rays convertable to light emitted after stimulation) and the screen efficiency (e.g. the fraction of emitted light escaping from the screen after irradiation with stimulating rays) should not be affected in a negative way by the reduction of the phosphor particle size. As a particular advantage the computed radiographic recording and reproducing techniques presented hereinbefore show a radiation image containing a large amount of information, obtainable with a markedly lower dose of radiation than in conventional radiography.

For clinical diagnosis and routine screening of asymptomatic female population, screen-film mammography today still represents the state-of-the-art technology for early detection of breast cancer. However, screen-film mammography has limitations which reduce its effectiveness.

Because of the extremely low differentiation in radiation absorption densities in the breast tissue, image contrast is inherently low. Film noise and scatter radiation further reduce contrast making detection of microcalcifications difficult in the displayed image. So e.g. film gradient must be balanced against the need for wider latitude.

Digital radiography systems can be broadly categorized as primary digital and secondary digital systems. Primary digital systems imply direct conversion of the radiation incident on a sensor into usable electric signals to form a digital image. Secondary digital-systems, on the other hand, involve an intermediary step in the conversion of radiation to a digital image. For example, in digital fluoroscopy, image intensifiers are used for intermediary conversion of X-rays into a visible image that is then converted to a digital image using a video camera. Similarly, digital X-ray systems using photostimulated luminescence (PSL) plates, first store the virtual image as chemical energy. In a second step, the stored chemical energy is converted into electric signals using a laser to scan the PSL plate to form a digital image.

Furthermore, various schemes using silicon photodiode arrays in scanning mode for digital radiography systems have been employed. However, these photodiode arrays require intermediate phosphor screens to convert X-rays into visible light, because of the steep fall-off in quantum efficiency (sensitivity) of the arrays at energies above 10 keV.

A preferably employed stimulable phosphor, embedded in a phosphor plate, is a phosphor which absorbs not only a radiation having a wavelength lower than 250 nm but also visible or ultraviolet light in the wavelength region of 250 to 400 nm, and further gives a stimulated emission of a wavelength in the range of 300 to 500 nm when it is irradiated with stimulating rays in the wavelength range of 400 to 900 nm.

Examples of well-known, frequently used stimulable phosphors include divalent europium activated phosphors (e.g., BaFBr:Eu, BaFBrI:Eu) or cerium activated alkaline earth metal halide phosphors and cerium activated oxyhalide phosphors, as well as e.g. a phosphor having the formula of $YLuSiO_5:Ce,Zr$.

In the present invention it is envisaged to randomly use screens containing either divalent europium activated alkali halide type phosphor screens, wherein said halide is at least one of chloride, bromide and iodide or a combination thereof or divalent europium activated alkaline earth metal phosphor screens wherein said halide is at least one of fluoride, chloride, bromide and iodide or a combination thereof. Most preferred is random use of divalent europium activated CsX type phosphor screens, wherein said X represents Br or a combination of Br with at least one of Cl and I, as Br(Cl), Br(I) or Br(Cl,I) and bariumfluorohalide phosphor screens wherein the phosphor is of the $(Ba,M^{II})FX':Eu$ type, wherein $M^{II}$ is an alkaline earth metal and wherein X' is Cl, Br and/or I.

Crystalline divalent europium activated alkali halide phosphor screens advantageously have $CsBr:Eu^{2+}$ storage phosphor particles, in binderless layers in the form of cylinders (and even up to a needle-shaped form) wherein said cylinder has an average cross-section diameter in the range from 1 μm to 30 μm (more preferred: from 2 μm up to 15 μm), an average length, measured along the casing of said cylinder, in the range from 100 μm up to 1000 μm (more preferred: from 100 μm up to 500 μm) as has e.g. been described in EP-A 1 359 204. Such block-shaped, prismatic, cylindrical or needle-shaped phosphors, whether or not obtained after milling, are, in another embodiment, coated in a phosphor binder layer.

According to another embodiment of the present invention said stimulable phosphors are $(Ba,M^{II})FX':Eu$ type phosphors, wherein $M^{II}$ is an alkaline earth metal and wherein X' is Cl, Br and/or I. In a preferred embodiment, said $M^{II}$ is $Sr^{2+}$. Powder phosphor screens that are advantageously used in the system of the present invention have europium activated alkaline earth metal halide phosphor screens containing $Ba(Sr)FBr:Eu^{2+}$ storage phosphor particles, dispersed in a binder medium in their corresponding storage phosphor layers.

The recorded image itself is reproduced by stimulating the exposed photostimulable phosphor screens by means of stimulating radiation and by detecting the light that is emitted by the phosphor screen upon stimulation and converting the detected light into an electric signal representation of the radiation image.

In a specific embodiment light emitted by the phosphor screen upon stimulation is detected by means of an array of charge coupled devices. In order to obtain a good collection efficiency the light emitted by the phosphor screen upon stimulation is guided by means of a light guide onto the array of charge coupled devices. In one embodiment this light guide is implemented in the form of a fibre optic plate (FOP). A FOP plate consists of a number of juxtaposed optical fibres that together form a two-dimensional light guiding array. The first dimension of the array corresponds with the length of a scan line on the photostimulable phosphor screen while the second dimension covers the width of the array of transducer elements. In this way the light emitted when stimulating a scan line on the photostimulable phosphor screen is guided onto the array of transducer elements in a point-by-point like fashion. The light the phosphor screen is exposed to in order to be stimulated should be separated from the light emitted by the screen upon stimulation. An easy way to separate stimulating light and emission light is to make use of an optical filter in between the light input face of the fibre optic plate and the phosphor screen. Colored glass filters are widely used for this purpose.

An optimized resolution is obtained when the fibre optic plate is in close contact with the phosphor screen. Colored glass filters however are rather thick, so that provision of a colored glass filter in between the fibre optic plate and the phosphor screen is incompatible with the requirement of having close contact between the fibre optic plate and screen.

Whatever stimulable or storage phosphor screen is applied in medical diagnostic imaging, light emitted by the phosphor screen upon stimulation should be separated from stimulation light. When use is made of a storage phosphor panel containing e.g. a CsBr:Eu phosphor, the stimulating light source is a light source emitting light in the range of 600 to 800 nm and the filter should absorb the laser light to an extent as high as possible, while at the same time absorption by the same filter of the light emitted upon stimulation, having maximum emission of radiation at 440 nm, should be minimized.

An optimized optical density of the filter in the stimulation wavelength range should at least have a density value of 6, while the transmission in the emission wavelength range should at least exceed 50%, resulting in a density equal to or less than 0.30. An optical density of 6 means that the laser light is attenuated with a factor of $10^6$, or otherwise expressed that an absorption of 99.9999% is attained. To achieve these specifications by means of a glass filter such as a BG 39 Schott® filter, the thickness of the filter should at least be 5 mm, being extremely thick and laying burden on sharpness.

In case of a read-out apparatus as described higher wherein the light emitted by the phosphor screen is guided to the array of transducer elements via a FOP, the gap between the input face of the FOP and the phosphor screen can only be approximately 100 μm in order to provide the desired high resolution. It is thus clear that a glass filter is not suitable for this application. When the FOP is replaced by an array of microlenses or a selfoc array, this gap would attain a value in the range of 2 to 3 mm. Even in this case use of a glass filter as described higher would provide insufficient sharpness.

From a point of view of practical use, as already suggested hereinbefore, different stimulable phosphor screens or panels are desired, all of them, in at random order, to give stimulated emission in the wavelength range of 300–500 nm when excited with stimulating rays in the wavelength range of 500–850 nm. Preventing the 500–850 nm light from reaching the detector is particularly important when the detector is a CCD having the highest quantum efficiency in the red region. The stimulation light can only be filtered away when the wavelength of the light emitted upon stimulation is quite different from the green or red stimulation light, i.e., that there is no or a only negligable overlap between the stimulation radiation spectrum and the stimulated emission radiation spectrum. In favor of customer-friendly handling or manutention in a medical radiographic environment, wherein a lot of phosphor plates or panels are exposed and read out (processed) one after another, even if processed in an at random order, it is recommended that detection of the blue light, emitted after photostimulation, proceeds with filters transmitting blue light for all screens or panels, without the need to change filters inbetween consecutive readings. Use of only one, same filter for all of the different plates scanned in one, same scanning unit, in applications requiring an optimized image quality as well as in applications requiring ordinary image quality, would be highly desired, more particularly in favor of cost reduction. Use of only one scanner would be highly appreciated for different types of plates.

In one aspect, as in EP-A 1 065 525, a system for reading a radiation image from a phosphor screen comprises a specific divalent europium activated cesium halide phosphor, provided with filtering means comprising a dye in order to prevent light emitted by said source of stimulation light from being detected by transducer elements and is restricted to one phosphor type. As the dye has an absorption spectrum with an absorption peak falling within the range of 600 to 800 nm, with a maximum of said peak attaining a value corresponding with at least 99% absorption and with an absorption in the range of 400 to 500 nm of less than 25%, this is not sufficient in order to bring a solution for the problems set out hereinbefore.

OBJECTS AND SUMMARY OF THE INVENTION

Therefore, it is a first object of the present invention to provide a system for reading out a plurality of storage phosphor panels used for distinct radiological applications and exposed to X-rays one after another, so that even when handled in a random order, no change in radiation transmitting filters is required when scanning said exposed storage phosphor panels.

More particularly, it is an object to make use of only one and the same scanning unit, in applications requiring optimum image quality as well as in applications requiring ordinary image quality, thereby reducing costs.

It is therefore envisaged to provide a system for reading out a plurality of storage phosphor panels wherein a radiation image has been stored in photostimulable phosphor screens, wherein the screen is erased inbetween successive recordings to an adequate extent in order to permit immediate re-use of the screen.

It is a further object of the present invention to provide such a system that is compact and has, at the same time, a high throughput.

Further advantages and embodiments of the present invention will become apparent from the following description and from the claims.

DETAILED DESCRIPTION OF THE INVENTION

Figure 1A:
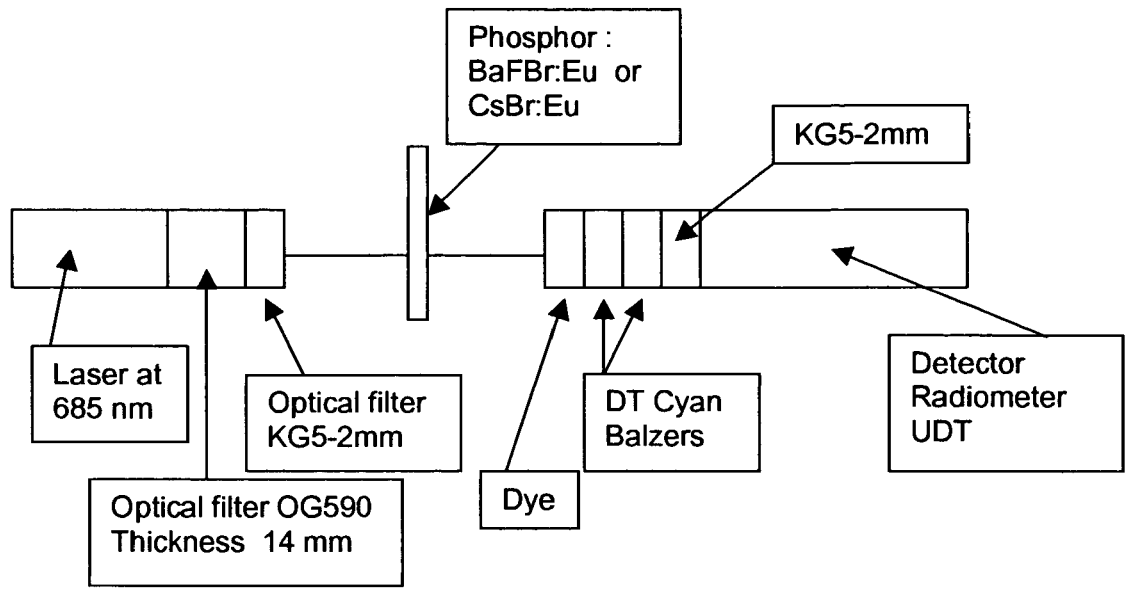
FIGS. 1A and 1B are showing a comparative experimental set up used in order to read out storage phosphor screens having stored energy after X-ray exposure, wherein said screens have different phosphor compositions and wherein combinations of filters are used in order to detect radiation emitted upon stimulation.
Figure 1B:
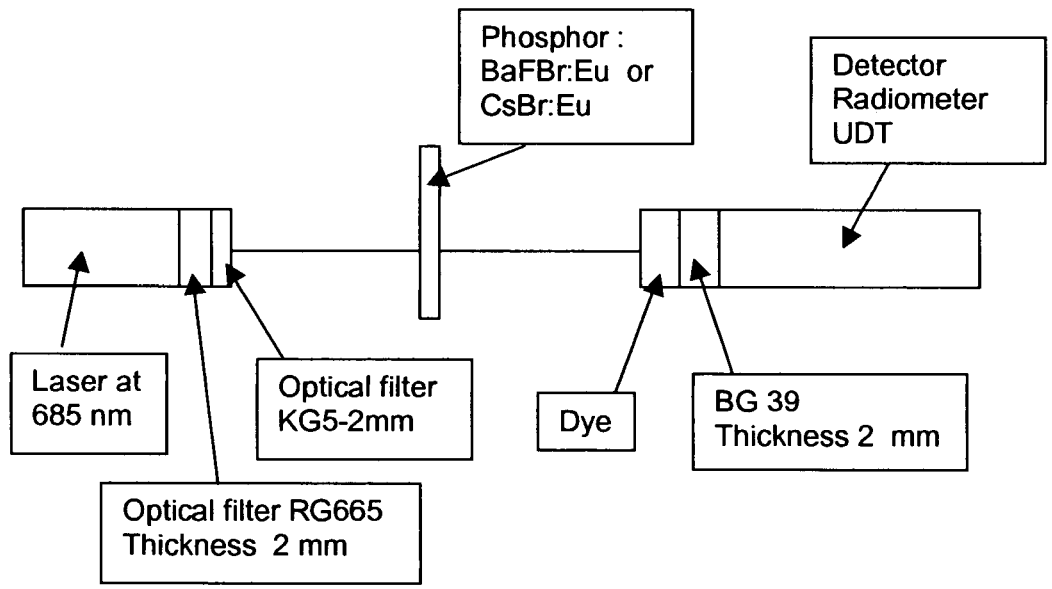

According to the present invention a system is provided for reading out stimulable phosphor screens, plates or panels after exposing phosphor coatings thereof in a phosphor layer on a substrate to X-rays, wherein said system comprises at least one source of stimulating radiation, an array of transducer elements arranged for detecting light emitted upon stimulation and for converting said light into a signal representation of said image, and filtering means for preventing light emitted by said source of stimulation light from being detected by said transducer elements, characterized in that a ratio of transmission at the stimulating emission wavelength of said source of stimulation light and transmission of stimulated light in the wavelength range between 350 nm and 500 nm is less than $10^{-6}$, wherein said ratio is defined by the formula (1):

$$Tr(\lambda_{st}(nm))/Tr(\lambda_{x}(nm))<10^{-6} \qquad (1)$$

wherein $\lambda_{st}$ is the stimulation wavelength
and wherein
350 nm$<\lambda_{x}<$500 nm.

In one embodiment of the system according to the present invention, said transducer elements for detecting light emitted upon stimulation and for converting said light into a signal representation of said image are charge-coupled devices (CCD's).

More particularly according to the present invention a system is provided wherein said filtering means comprises at least one organo transition metal dye.

Preferably said organo transition metal dye is a compound according to the general formula (I)

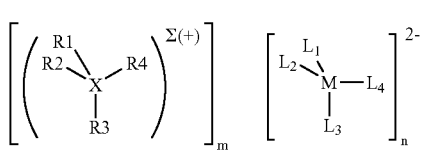

wherein n≧1, m≧1, Σ(+)≧1,
wherein −2n=mΣ(+),
wherein X=N or P,
wherein M=Co or Ni,
wherein $R^1$, $R^2$, $R^3$ and $R^4$ are the same or different and each independently represents a (substituted or unsubstituted, saturated or unsaturated) alkyl group, a (substituted or unsubstituted, saturated or unsaturated) aliphatic group, a (substituted or unsubstituted) alicyclic hydrocarbon group, a (substituted or unsubstituted) aromatic group, a (substituted or unsubstituted) heteroaromatic group, a (substituted or unsubstituted) hyperbranched polymer group, a (substituted or unsubstituted) dendrimeric group or $R^1$, $R^2$, $R^3$ and $R^4$ each independently represents the necessary atoms to form a ring system with one another, and
wherein $L^1$, $L^2$, $L^3$ and $L^4$ each independently represents one of F, Cl, Br and I, and
when m=1, then Σ(+)=2n and consequently 2n positively charged centers are present in the cation, and
when n=1 and Σ(+)=1, then m=2 and consequently two cations ($X^+R^1R^2R^3R^4$) and ($X^+R^5R^6R^7R^8$) are present in the molecule,
wherein $R^5$, $R^6$, $R^7$, $R^8$ are the same or different and each independently represents a (substituted or unsubstituted, saturated or unsaturated) alkyl group, a (substituted or unsubstituted, saturated or unsaturated) aliphatic group, a (substituted or unsubstituted) alicyclic hydrocarbon group, a (substituted or unsubstituted) aromatic group, a (substituted or unsubstituted) heteroaromatic group, a (substituted or unsubstituted) hyperbranched polymer group, a (substituted or unsubstituted) dendrimeric group or $R^5$, $R^6$, $R^7$ and $R^8$ each independently represents the necessary atoms to form a ring system with one another.

The term "alkyl" as used in disclosing the present invention means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl, without being limited thereto.

The term "saturated aliphatic group" as used in disclosing the present invention means saturated straight chain, branched chain and alicyclic hydrocarbon groups.

The term "unsaturated aliphatic group" as used in disclosing the present invention means straight chain, branched chain and alicyclic hydrocarbon groups which contain at least one double or triple bond.

The term "aromatic group" as used in disclosing the present invention means a covalently bound assemblage of cyclic conjugated carbon atoms, which are characterized by large resonance energies, e.g. benzene, naphthalene and anthracene.

The term "alicyclic hydrocarbon group" means a covalently bound assemblage of cyclic conjugated carbon atoms, which do not form an aromatic group, e.g. cyclohexane.

The term "substituted" as used in disclosing this invention means that one or more of the carbon atoms and/or that a hydrogen atom of one or more of the carbon atoms in an aliphatic group, an aromatic group or an alicyclic hydrocarbon group, are replaced by an oxygen atom, a nitrogen atom, a phosphorus atom, a silicon atom, a sulfur atom, a selenium atom or a tellurium atom, or a group containing one or more of these said carbon and hydrogen replacing atoms. Such substituents include hydroxyl groups, thiol groups, carbamate groups, urea groups, ether groups, thioether groups, nitrile groups, ketones, carboxylic acid groups, ester groups, sulphonate groups, sulphonamide groups, phosphonate groups, phosphonamide groups, phosphonamidate groups, amide groups, amine groups, ammonium groups, sulphonium groups and phosphonium groups.

The terms "ammonium group", "sulphonium group" and "phosphonium group" respectively mean a positively charged nitrogen, sulphur and phosphor atom.

The term "heteroaromatic group" means an aromatic group wherein at least one of the cyclic conjugated carbon atoms is replaced by a nitrogen atom or a phosphorus atom.

The term "heterocyclic group" means an alicyclic hydrocarbon group wherein at least one of the cyclic conjugated carbon atoms is replaced by an oxygen atom, a nitrogen atom, a phosphorus atom, a silicon atom, a sulfur atom, a selenium atom or a tellurium atom.

The term "Σ(+)" means the sum of the positive charges in the cation.

The term "dendrimeric group" and the term "hyperbranched polymer group" have the meaning as described in the following literature references (a) C. Gao, D. Yan, Progress in Polymer Science 29 (2004), 183–275, (b) Topics in Current Chemsitry Volumes 197, 210, 211 and 217, (c) Jikei, M.; Kakimoto, M. Prog. Polym. Sci. 2001, 26, 1233, (d) Newkome, G. R.; Moorefield, C. N.; Vögtle, F. Dendritic Molecules:Concepts, Synthesis, Perspectives; VCH: Weinheim, 2001, (e) Kim, Y. H. J. Polym. Sci., Polym. Chem. Ed. 1998, 36, 1685, (f) Voit, B. I. J. Polym. Sci., Polym. Chem. 2000, 38, 2505, (g) Sunder, A.; Heinemann, J.; Frey, H. Chem. Eur. J. 2000, 6, 2499. From these reviews, it is obvious that hyperbranched polymers must be clearly distinguished from the regularly branched dendrimers.

The term "organo transition metal dye" means a compound with an absorption in the visual and/or infrared part of the spectrum and which contains both a transition metal ion and organic counterions.

The dyes according to the present invention can be prepared according to synthetic methods known to those who are skilled in the art of organic synthesis. A detailed description is given in the section Examples, I. Dye Synthesis. More information can also be found in references such as Transition Metal Chemistry (London), 1997, 22(2), 117–122 and the references mentioned above.

Examples of preferred dyes according to general formula (I), however not limited to these examples, are given in Table 1 and Table 2.

TABLE 1

Dyes according to general formula (I), wherein X = P and where for the tabulated dyes: n = 1; Σ(+) = 1; m = 2 being $P^+R^1R^2R^3R^4$ and $P^+R^5R^6R^7R^8$

| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|
| 1 | Butyl | Butyl | Butyl | Benzyl | Cl | Cl | Cl | Cl |
| 2 | Butyl | Butyl | Butyl | Cetyl | Cl | Cl | Br | Br |
| 3 | Butyl | Butyl | Butyl | Octadecyl | Cl | Cl | Cl | Cl |
| 4 | Methyl | Octyl | Octyl | Octyl | Br | Br | Br | Br |
| 5 | Methyl | Octyl | Octyl | Octyl | Cl | Cl | Cl | Cl |
| 6 | Butyl | Butyl | Butyl | Benzyl | Br | Br | Br | Br |
| 7 | Butyl | Butyl | Butyl | Cetyl | Cl | Cl | Cl | Cl |
| 8 | Butyl | Butyl | Butyl | Cetyl | Br | Br | Br | Br |
| 9 | Butyl | Butyl | Butyl | Cetyl | Cl | Cl | Br | Cl |
| 10 | Butyl | Butyl | Butyl | Cetyl | Cl | Cl | Br | I |
| 11 | Phenyl | Phenyl | Phenyl | Cetyl | Cl | Cl | Br | Cl |
| 12 | Phenyl | Phenyl | Phenyl | Methyl | Cl | Cl | Cl | Cl |
| 13 | Methyl | Methyl | Methyl | Cetyl | Br | Br | Br | Br |
| 14 | Phenyl | Phenyl | Phenyl | Benzyl | Cl | Cl | Cl | Cl |
| 15 | Phenyl | Phenyl | Phenyl | 2-hydroxyethyl | Br | Br | Br | Br |
| 16 | Phenyl | Phenyl | Phenyl | 2-hydroxyethyl | Cl | Cl | Cl | Cl |
| 17 | Phenyl | Phenyl | Phenyl | 2-hydroxyethyl | Cl | Cl | Br | Br |
| 18 | Phenyl | Phenyl | Phenyl | CH2CH2CO2H | Cl | Cl | Cl | Cl |
| 19 | Phenyl | Phenyl | Phenyl | CH2CH2CO2Et | Cl | Cl | Cl | Cl |
| 20 | Butyl | Butyl | Butyl | CH2CH2CO2H | Cl | Cl | Cl | Cl |
| 21 | Butyl | Butyl | Butyl | CH2CH2CO2Et | Cl | Cl | Cl | Cl |
| 22 | Butyl | Butyl | Butyl | 3-trimethoxysilylpropyl | Cl | Cl | Cl | Cl |
| 23 | Butyl | Butyl | Butyl | 3-trimethoxysilylpropyl | Br | Br | Br | Br |
| 24 | Butyl | Butyl | Butyl | 3-trimethoxysilylpropyl | Cl | Cl | Br | I |
| 25 | Octyl | Octyl | Octyl | CH2CH2CO2H | Cl | Cl | Cl | Cl |
| 26 | Propyl | Propyl | Propyl | Cetyl | Br | Cl | Cl | Cl |
| 27 | Ethyl | Ethyl | Ethyl | Cetyl | Cl | Cl | Cl | Cl |
| 28 | Ethyl | Ethyl | Ethyl | Cetyl | Br | Br | Br | Br |
| 29 | i-butyl | i-butyl | i-butyl | Cetyl | Br | Cl | Cl | I |
| 30 | Benzyl | Benzyl | Benzyl | Cetyl | Br | Cl | Cl | I |

31

[Structure: bis-phosphonium cation with two $P^+$ centers each bearing three $C_4H_9$ groups, connected by $(CH_2)_8$ linker; counterion $[CoCl_2Br_2]^{2-}$]

32

[Structure: tri(octyl)cyclohexylphosphonium cation $P^+$ with cyclohexyl and three $C_8H_{17}$ groups; counterion $[CoCl_4]^{2-}$]

[Structure: tri(octyl)cyclohexylphosphonium cation with cyclohexyl and three $C_8H_{17}$ groups]

33

[Structure: tri(octyl)cyclohexylphosphonium cation with cyclohexyl and three $C_8H_{17}$ groups; counterion $[CoCl_2Br_2]^{2-}$]

[Structure: tri(octyl)cyclohexylphosphonium cation with cyclohexyl and three $C_8H_{17}$ groups; counterion $[CoI_4]^{2-}$]

34

[Structure: dimethyl-dicyclohexylphosphonium cation $P^+$ with two cyclohexyl and two methyl groups]

35

[Structure: bis(triphenylphosphonium) cation with two $P^+(C_6H_5)_3$ groups connected by a hexamethylene $(CH_2)_6$ linker; counterion $[CoCl_2Br_2]^{2-}$]

36

[Structure: bis-phosphonium cation with two $P^+$ centers: one bearing two phenyl groups and one $C_4H_9$, the other bearing one phenyl and two $C_4H_9$ groups, connected by $(CH_2)_8$ linker]

TABLE 1-continued

Dyes according to general formula (I), wherein X = P and
where for the tabulated dyes: n = 1; Σ(+) = 1; m = 2
being P⁺R¹R²R³R⁴ and P⁺R⁵R⁶R⁷R⁸

| Dye | R¹ = R⁵ | R² = R⁶ | R³ = R⁷ | R⁴ = R⁸ | X¹ X² X³ X⁴ |
|---|---|---|---|---|---|

(structures for dyes 37, 38, 39, 40 with corresponding CoCl/Br anions)

TABLE 1-continued

Dyes according to general formula (I), wherein X = P and
where for the tabulated dyes: n = 1; Σ(+) = 1; m = 2
being P⁺R¹R²R³R⁴ and P⁺R⁵R⁶R⁷R⁸

| Dye | R¹ = R⁵ | R² = R⁶ | R³ = R⁷ | R⁴ = R⁸ | X¹ X² X³ X⁴ |
|---|---|---|---|---|---|

(structures for dyes 41, 42, 43, 44 with corresponding CoCl/Br anions)

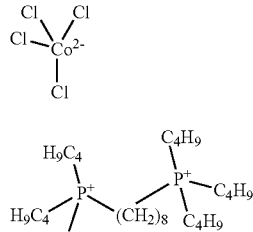

TABLE 1-continued

Dyes according to general formula (I), wherein X = P and where for the tabulated dyes: n = 1; Σ(+) = 1; m = 2 being $P^+R^1R^2R^3R^4$ and $P^+R^5R^6R^7R^8$

| Dye | $R^1 = R^5$ | $R^2 = R^6$ | $R^3 = R^7$ | $R^4 = R^8$ | $X^1$ $X^2$ $X^3$ $X^4$ |
|---|---|---|---|---|---|
| 54 | | | | | $CoF_2Br_2^{2-}$ |
| 55 | | | | | $CoFBr_3^{2-}$ |
| 56 | | | | | $CoFBr_2Cl^{2-}$ |
| 57 | | | | | $CoF_2Cl_2^{2-}$ |
| 58 | | | | | $CoF_2I_2^{2-}$ |
| 59 | | | | | $CoBr_2Cl_2^{2-}$ |
| 60 | | | | | $CoBr_2Cl_2^{2-}$ |

(For dyes 54–57: $R^1=R^5=C_{16}H_{33}$, $R^2=R^6=R^3=R^7=R^4=R^8=C_4H_9$)

For dye 58: phosphonium groups bear phenyl, (2-methoxyphenyl), and $C_{16}H_{33}$ substituents bridged by $-CH_2CH_2-$.

For dyes 59, 60: phosphonium groups bear phenyl substituents and $C_{16}H_{33}$ bridged by $-CH_2CH_2-$.

Dye 60 anion: $CoCl_4^{2-}$

TABLE 1-continued

Dyes according to general formula (I), wherein X = P and where for the tabulated dyes: n = 1; Σ(+) = 1; m = 2 being P⁺R¹R²R³R⁴ and P⁺R⁵R⁶R⁷R⁸

| Dye | R¹ = R⁵ | R² = R⁶ | R³ = R⁷ | R⁴ = R⁸ | X¹ X² X³ X⁴ |
|---|---|---|---|---|---|
| 61 | (structures shown) | | | | |
| 62 | (structures shown) | | | | |
| 63 | (structures shown) | | | | |
| 64 | (structures shown) | | | | |
| 65 | (structures shown) | | | | |
| 66 | (structures shown) | | | | |
| 67 | (structures shown) | | | | |
| 68 | (structures shown) | | | | |

TABLE 1-continued

Dyes according to general formula (I), wherein X = P and where for the tabulated dyes: n = 1; Σ(+) = 1; m = 2 being $P^+R^1R^2R^3R^4$ and $P^+R^5R^6R^7R^8$

| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|

Anion: $[NiBr_4]^{2-}$

Cation: phosphonium with substituents $C_5H_{11}$ (neopentyl-type chain), and three $C_4H_9$ groups on $P^+$

TABLE 2

Dyes according to general formula (I), wherein X = N and where for the tabulated dyes: n = 1; Σ(+) = 1; m = 2 being $N^+R^1R^2R^3R^4$ and $N^+R^5R^6R^7R^8$

| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|
| 69 | Methyl | Octyl | Octyl | Octyl | Cl | Cl | Cl | Cl |
| 70 | Methyl | Octyl | Octyl | Octyl | Br | Br | Br | Br |
| 71 | Butyl | Butyl | Butyl | Octadecyl | Cl | Cl | Cl | Cl |
| 72 | Methyl | Octyl | Octyl | Octyl | Cl | Cl | I | I |
| 73 | Methyl | Octyl | Octyl | Octyl | Cl | Cl | Br | Br |
| 74 | Butyl | Butyl | Butyl | Benzyl | Br | Br | Br | Br |
| 75 | Butyl | Butyl | Butyl | Cetyl | Cl | Cl | Cl | Cl |
| 76 | Butyl | Butyl | Butyl | Cetyl | Br | Br | Br | Br |
| 77 | Butyl | Butyl | Butyl | Cetyl | Cl | Cl | Br | Cl |
| 78 | Butyl | Butyl | Butyl | Cetyl | Cl | Cl | Br | I |
| 79 | Phenyl | Phenyl | Phenyl | Cetyl | Cl | Cl | Br | Cl |
| 80 | Phenyl | Phenyl | Phenyl | Methyl | Cl | Cl | Cl | Cl |
| 81 | Methyl | Methyl | Methyl | Cetyl | Br | Br | Br | Br |
| 82 | Phenyl | Phenyl | Phenyl | Benzyl | Cl | Cl | Cl | Cl |
| 83 | Phenyl | Phenyl | Phenyl | 2-hydroxyethyl | Br | Br | Br | Br |
| 84 | Phenyl | Phenyl | Phenyl | 2-hydroxyethyl | Cl | Cl | Cl | Cl |
| 85 | Phenyl | Phenyl | Phenyl | 2-hydroxyethyl | Cl | Cl | Br | Br |
| 86 | Phenyl | Phenyl | Phenyl | CH2CH2CO2Me | Cl | Cl | Cl | Cl |
| 87 | i.Propyl | i.Propyl | Ethyl | Cetyl | Cl | Cl | Cl | Cl |
| 88 | Butyl | Butyl | Butyl | CH2CH2CO2Me | Cl | Cl | Cl | Cl |
| 89 | i.Propyl | i.Propyl | Ethyl | Cetyl | Br | Br | Br | Br |
| 90 | Butyl | Butyl | Butyl | 3-trimethoxy silylpropyl | Cl | Cl | Cl | Cl |
| 91 | Butyl | Butyl | Butyl | 3-trimethoxy silylpropyl | Br | Br | Br | Br |
| 92 | Butyl | Butyl | Butyl | 3-trimethoxy silylpropyl | Cl | Cl | Br | I |
| 93 | Octyl | Octyl | Octyl | CH2CH2CO2Me | Cl | Cl | Cl | Cl |
| 94 | Propyl | Propyl | Propyl | Cetyl | Br | Cl | Cl | Cl |
| 95 | Ethyl | Ethyl | Ethyl | Cetyl | Cl | Cl | Cl | Cl |
| 96 | Ethyl | Ethyl | Ethyl | Cetyl | Br | Br | Br | Br |
| 97 | i-butyl | i-butyl | i-butyl | Cetyl | Br | Cl | Cl | I |
| 98 | Benzyl | Benzyl | Benzyl | Cetyl | Br | Cl | Cl | I |

Dye 99: Bis-ammonium cation: $(C_4H_9)_3N^+$–$(CH_2)_8$–$N^+(C_4H_9)_3$; anion: $[CoBr_2Cl_2]^{2-}$

TABLE 2-continued

Dyes according to general formula (I), wherein X = N and where for the tabulated dyes: n = 1; Σ(+) = 1; m = 2 being $N^+R^1R^2R^3R^4$ and $N^+R^5R^6R^7R^8$

| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|

Dye 100: Cation: cyclohexyl-N$^+$(C$_8$H$_{17}$)$_3$; Anion: $[CoCl_4]^{2-}$

Dye 101: Two cyclohexyl-N$^+$(C$_8$H$_{17}$)$_3$ cations; Anion: $[CoBr_2Cl_2]^{2-}$

Dye 102: Cation: dicyclohexyl-dimethylammonium $N^+$(cyclohexyl)$_2$(CH$_3$)$_2$; Anion: $[CoI_4]^{2-}$; plus additional dicyclohexyl-dimethylammonium cation.

TABLE 2-continued

Dyes according to general formula (I), wherein X = N and where for the tabulated dyes: n = 1; Σ(+) = 1; m = 2 being N⁺R¹R²R³R⁴ and N⁺R⁵R⁶R⁷R⁸

| Dye | R¹ = R⁵ | R² = R⁶ | R³ = R⁷ | R⁴ = R⁸ | X¹ X² X³ X⁴ |
|---|---|---|---|---|---|
| 103 | (structure: bis-triphenylammonium with (CH₂) linker); counterion: [Br–Co²⁻(I)(I)(Br)] | | | | |
| 104 | (structure: diphenyl-dibutyl diammonium with (CH₂)₈ linker); counterion: [Br–Co²⁻(Cl)(Cl)(Br)] | | | | |
| 105 | (structure: cyclohexyl-tri(C₈H₁₇) ammonium); counterion: [Cl–Co²⁻(Cl)(Cl)(Cl)] | | | | |
| | (structure: methyl-tri(C₈H₁₇) ammonium) | | | | |
| 106 | (structure: C₁₆H₃₃-tri(C₄H₉) ammonium); counterion: [Cl–Co²⁻(Cl)(Cl)(Cl)] | | | | |
| 107 | (structure: methyl-tri(C₈H₁₇) ammonium) (structure: C₁₆H₃₃-tri(C₄H₉) ammonium); counterion: [Br–Co²⁻(Cl)(Cl)(Br)] | | | | |
| | (structure: benzyl-tri(C₄H₉) ammonium) | | | | |
| 108 | (structure: C₅H₁₁ branched with tri(C₄H₉) ammonium); counterion: [Cl–Co²⁻(Cl)(Cl)(Cl)] | | | | |
| | (structure: C₅H₁₁ branched with tri(C₄H₉) ammonium) | | | | |
| 109 | (structure: C₅H₁₁ branched with tri(C₄H₉) ammonium); counterion: [Br–Co²⁻(Br)(Br)(Br)] | | | | |
| | (structure: C₅H₁₁ branched with tri(C₄H₉) ammonium) | | | | |
| 110 | (structure: C₅H₁₁ branched with tri(C₄H₉) ammonium) | | | | |

TABLE 2-continued

Dyes according to general formula (I), wherein X = N and where for the tabulated dyes: n = 1; Σ(+) = 1; m = 2 being N⁺R¹R²R³R⁴ and N⁺R⁵R⁶R⁷R⁸

| Dye | R¹ = R⁵ | R² = R⁶ | R³ = R⁷ | R⁴ = R⁸ | X¹ X² X³ X⁴ |
|---|---|---|---|---|---|
| 111 | | | | | |
| 112 | | | | | |
| 113 | | | | | |
| 114 | | | | | |
| 115 | | | | | |
| 116 | | | | | |
| 117 | | | | | |
| 118 | | | | | |

TABLE 2-continued

Dyes according to general formula (I), wherein X = N and where for the tabulated dyes: n = 1; Σ(+) = 1; m = 2 being $N^+R^1R^2R^3R^4$ and $N^+R^5R^6R^7R^8$

| Dye | $R^1 = R^5$ | $R^2 = R^6$ | $R^3 = R^7$ | $R^4 = R^8$ | $X^1$ | $X^2$ | $X^3$ | $X^4$ |
|---|---|---|---|---|---|---|---|---|

119, 120, 121, 122, 123, 124, 125, 126 (structures shown)

TABLE 2-continued

Dyes according to general formula (I), wherein X = N and where for the tabulated dyes: n = 1; Σ(+) = 1; m = 2 being N⁺R¹R²R³R⁴ and N⁺R⁵R⁶R⁷R⁸

| Dye | R¹ = R⁵ | R² = R⁶ | R³ = R⁷ | R⁴ = R⁸ | X¹ X² X³ X⁴ |
|---|---|---|---|---|---|
| 127 | H₃₃C₁₆–O–CH₂CH₂–N⁺(CH₃)₂– | | | | Br₃Co²⁻–Br (Br, Br, Br) |
| | H₃₃C₁₆–O–CH₂CH₂–N⁺(CH₃)₂– | | | | |
| 128 | pyridinium-CH₂– (N⁺–C₈H₁₇) | C₈H₁₇ | C₈H₁₇ | C₈H₁₇ | Cl₃Co²⁻–Cl (Cl, Cl, Cl) |
| 129 | (tBu)₂P⁺–(CH₂)₃–N⁺(CH₃)₂– | C₈H₁₇ | C₈H₁₇ | | Br₂Co²⁻–Cl (Br, Cl) |
| 130 | H₃₃C₁₆ | C₄H₉ | C₄H₉ | C₄H₉ | Br₄Ni²⁻ (Br, Br, Br, Br) |
| 131 | H₃₃C₁₆ | C₄H₉ | C₄H₉ | C₄H₉ | Cl₄Ni²⁻ (Cl, Cl, Cl, Cl) |
| 132 | H₃₃C₁₆ | C₄H₉ | C₄H₉ | C₄H₉ | Cl₄Ni²⁻ (Cl, Cl, Cl, Cl) |
| 133 | H₃₃C₁₆ | C₄H₉ | C₄H₉ | C₄H₉ | Cl₂I₂Ni²⁻ (Cl, I, I, Cl) |
| 134 | H₉C₄–N⁺(C₄H₉)₂–(CH₂)₈–N⁺(C₄H₉)₂–C₄H₉ | | | | Cl₄Ni²⁻ (Cl, Cl, Cl, Cl) |
| 135 | (CH₃)₃C–CH₂–CH(CH₃)–CH₂CH₂–CH(CH₃)– or C₅H₁₁–CH(CH₃)– | C₄H₉ | C₄H₉ | C₄H₉ | Br₄Ni²⁻ (Br, Br, Br, Br) |

TABLE 2-continued

Dyes according to general formula (I), wherein X = N and where for the tabulated dyes: n = 1; Σ(+) = 1; m = 2 being N⁺R¹R²R³R⁴ and N⁺R⁵R⁶R⁷R⁸

| Dye | R¹ = R⁵ | R² = R⁶ | R³ = R⁷ | R⁴ = R⁸ | X¹ | X² | X³ | X⁴ |
|-----|---------|---------|---------|---------|----|----|----|----|

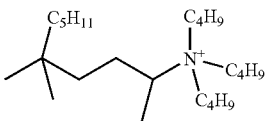

In one embodiment according to the present invention said organo transition metal dye is an organo cobalt dye and said dye is present as a viscous deep blue oil, and, in a preferred embodiment thereof, said viscous deep blue oil is applied between colored or non-colored glass plates or plastic foils. In another embodiment according to the present invention, said viscous deep blue oil is embedded in a polymer host. Said polymer host is, in a further embodiment, present in a UV-cured or thermally cured matrix. In still another embodiment said viscous deep blue oil is coated from a concentrated solvent-based coating solution, provided with the common additives known by anyone skilled in the art. In a particular embodiment one of said additives is a binder medium. The solvent used is further advantageously removed from the matrix by evaporation.

In a particular embodiment in the system according to the present invention, said viscous deep blue oil is embedded in a UV-curable monomer, an oligomer or mixtures thereof.

Photoinitiators suitable for use in UV-curing can be taken from the teachings in "Surface Coatings Technology" Volume III, 1998, "Photoinitiators for Free Radical Cationic & Anionic Photopolymerisation", 2nd Edition, from Crivello & Dietliker, Edited by G. Bradley, John Wiley and Sons, more in particular described on the pages 208–224.

Any polymerizable compound commonly known in the art may be employed. Particularly preferred for use as a radiation-curable compound in the radiation curable inkjet ink, are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylates such as described in U.S. Pat. No. 6,310,115, 2-(vinyloxy)ethylacrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4 butanediol diacrylate, 1,6 hexanediol diacrylate, 1,9 nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, caprolactam modified dipentaerythritol hexaacrylate, N-vinylamide such as N-vinylcaprolactam or N-vinylformamide; or acrylamide or a substituted acrylamide such as acryloylmorpholine; and amino functionalized polyetheracrylates such as described in U.S. Pat. No. 6,300,388.

In a very specific embodiment, without however limiting the present invention thereto, said organo transition metal dye is embedded in a UV-cured polymer host, wherein said polymer host is selected from the group consisting of an acrylate polymer, a methacrylate polymer and a mixture thereof. In a still further particular embodiment the said UV-cured polymer host is selected from the group consisting of a polymethylmethacrylate polymer, a polyethylmethacrylate polymer, a methyl methacrylate/butyl-methacrylate copolymer and a mixture thereof. Methacrylates may thus be used with these acrylates. Of the methacrylates, methoxypolyethylene glycol methacrylate, methoxytriethylene glycol methacrylate, 4-(vinyloxy)butylmethacrylate, vinyl ether acrylate such as described in U.S. Pat. No. 6,310,115, hydroxyethyl methacrylate, phenoxyethyl methacrylate, cyclohexyl methacrylate, tetraethylene glycol dimethacrylate, and polyethylene glycol dimethacrylate are preferred.

Examples of the above mentioned polymerizable oligomers include epoxy acrylates, aliphatic urethane acrylates, aromatic urethane acrylates, polyester acrylates, and straight-chained acrylic oligomers, without however being limited thereto.

According to the present invention said viscous oil further comprises a compound according to the formula $(R^1R^2R^3R^4)P^+X^-$ and $(R^1R^2R^3R^4)N^+X^-$, wherein $R^1$, $R^2$, $R^3$ and $R^4$ are the same or different and wherein each independently represents a (substituted or unsubstituted, saturated or unsaturated) alkyl group, a (substituted or unsubstituted, saturated or unsaturated) aliphatic group, a (substituted or unsubstituted) alicyclic hydrocarbon group, a (substituted or unsubstituted) aromatic group, a (substituted or unsubstituted) heteroaromatic group, a (substituted or unsubstituted) hyperbranched polymer group, a (substituted or unsubstituted) dendrimeric group or $R^1$, $R^2$, $R^3$ and $R^4$ each independently represents the necessary atoms to form a ring system with one another and wherein $X^-$ represents one of F, Cl, Br and I. Amounts of which said phosphonium and/or ammonium salts are added to the viscous oil are dependent upon the viscosity as desired. Preferred amounts are in the range from 0.1 to 50 wt %, more preferably in the range from 0.5 to 30 wt % and still more preferably in the range from 1 to 15 wt %.

According to the present invention a system is provided wherein said filtering means is further provided with at least one dielectric filter layer.

In a further preferred embodiment the system according to the present invention is provided with a colored filter which is installed between laser source and phosphor panel in order to provide spectrally pure stimulation. More particularly, in the system according to the present invention, said colored filter is a glass filter selected from the group of Schott® filters of the type OG590, RG610, RG630, RG645, RG665, KG1, KG2, KG3, KG4 and KG5.

In a further embodiment according to the present invention, a system is provided wherein said optical filter is installed between filtering means and detecting means in order to provide absorption of infrared fluorescence of said organo transition metal dye.

In a still further embodiment according to the present invention, a system is provided wherein said optical filter is installed between the storage phosphor panel and filtering means in order to reduce the excitation of infrared fluorescence of said organo transition metal dye by stimulation light reflected by the phosphor panel.

More particularly in the system according to the present invention said optical filter is a glass filter selected from the group of Schott® filters of the type KG1, KG2, KG3, KG4, KG5, BG18, BG38, BG39 and BG40.

In the system according to the present invention, transmitting light preferably proceeds with an efficiency of more than 50%, more preferably more than 60%, and even most preferably with an efficiency of more than 75%.

When the term "different" plates, panels or screens is used with respect to the storage phosphor in the system of the present invention, it is meant that there is a difference in emission spectrum between those plates, panels or screens. Said difference is e.g. due to the presence of phosphors differing in composition. Storage phosphor screens in the system of the present invention are selected from the group consisting of binder containing powder screens and binderless, crystalline or amorphous phosphor layer screens, wherein said phosphors are divalent europium activated alkali halide type phosphors or alkaline earth metal halide phosphors, wherein said halide is at least one of fluoride, chloride, bromide and iodide or a combination thereof.

A particular advantage of the present invention is related with the use of only one and same filter for all of the different storage phosphor plates coated with, especially, the preferred CsBr:Eu-type phosphors and the preferred BaFBr:Eu-type phosphors, scanned in one same scanning unit and used in applications requiring optimized as well as in applications requiring normal image quality.

According to the present invention a system is moreover provided wherein each of said storage phosphor screens, of a plurality of different phosphor screens, is consecutively subjected to following steps:

stimulating said stimulable phosphor screen with stimulation light, detecting stimulated emission light, emitted by said phosphor screen upon stimulation;

converting detected light signal into a digital representation of a radiation image;

erasing said phosphor screen by exposing it to erasing energy; and wherein differences in maximum absorption wavelength of stimulation spectra of each of said screens are in the range from 10 nm up to 100 nm, wherein differences in maximum emission of stimulated emission spectra of said screens are in the range from 10 nm up to 150 nm, and wherein filtering means are provided for preventing stimulation radiation from being detected by detecting means, and for transmitting radiation emitted upon stimulation.

In a preferred embodiment thereof said plurality of different phosphor screens transmitting radiation emitted upon stimulation provides differences in transmission by the filtering means of light emitted upon stimulation by the different phosphor screens of not more than 10%.

In the system according to the present invention, said stimulable phosphor screens are selected from the group consisting of binder layer containing screens and binderless phosphor layer screens.

Said binderless phosphor layer screen, preferably used in the system according to the present invention is provided with needle-shaped phosphors, having phosphor needles, aligned in parallel, under an angle in a range between 60° and 90° versus said substrate.

In one embodiment in the system according to the present invention, said binderless phosphor layer screen comprises said phosphor in a homogeneously solidified form.

In another embodiment in the system according to the present invention, said binder layer containing phosphor screen comprises a ground needle-shaped phosphor in non-aligned powdery form.

The system according to the present invention, in one embodiment, is provided with stimulable phosphor screens, wherein said stimulable phosphor is a divalent europium activated CsX-type phosphor, wherein said X represents Br or a combination of Br with at least one of Cl and I.

The system according to the present invention, in another embodiment, is provided with stimulable phosphor screens, wherein said stimulable phosphor is a $(Ba,M^{II})FX':Eu$ type phosphors, wherein $M^{II}$ is an alkaline earth metal and wherein X' represents Br or a combination of Br with at least one of Cl and I. In a further embodiment thereof, in the $(Ba,M^{II})FX':Eu$ type phosphors, $M^{II}$ is $Sr^{2+}$.

In the system of the present invention reading out a plurality of stimulable phosphor screens, plates or panels, is more particularly envisaged, after exposing said screens to X-rays (preferably having an energy in the range from 25 up to 150 kVp), wherein the phosphors, coated on a substrate in a phosphor layer are selected from the group consisting of a binderless phosphor layer and a binder medium layer as disclosed hereinbefore; wherein said phosphors are divalent europium activated alkali halide type phosphors, wherein said halide is at least one of chloride, bromide and iodide or a combination thereof, or wherein said phosphors are divalent europium activated alkaline earth metal halide type phosphors, wherein said halide is at least one of fluoride, chloride, bromide and iodide or a combination thereof and wherein said screens are consecutively subjected to following steps:

(1) stimulating said phosphor screens by means of stimulation energy, (2) detecting stimulated emission energy, emitted by the phosphor screen upon stimulation, (3) converting detected energy into a signal representation of said radiation image, (4) erasing said phosphor screen by exposing it to erasing energy, so that (1) differences in the position of the maxima in the stimulation spectra of said different screens are in the range from 10 nm up to 100 nm, (2) differences in the position of the maxima in the stimulated emission spectra of said different screens are in the range from 10 nm up to 150 nm (3) filtering means are provided for preventing stimulation radiation from being detected by detecting means, and for transmitting radiation emitted upon stimulation, wherein said filter transmits radiation in the range from 390 nm to 460 nm, more preferably from 380 nm to 480 nm and even more preferably 350 nm to 500 nm, blocking red light from being transmitted.

The system of the present invention is advantageously provided with filtering means comprising a dye, transmitting radiation light in the wavelength range from 390 up to 460 nm, preferably from 380 nm up to 480 nm and even more preferably in the wavelength range from 350 nm up to 500 nm, wherein in the system of the present invention, said filtering means comprises an organo transition metal dye, and, more preferably, a dye according to at least one of the specific formulae disclosed hereinbefore. This particular part of the system effectively prevents red to infrared stimulation light to be captured by the detecting means, which should be sensitive to radiation wavelengths in the blue wavelength range of the spectrum as stimulated radiation emitted by the storage phosphor is in the blue wavelength range.

The transmission spectra of the dyes according to the present invention can be fine-tuned by changing both the ligands on the transition metal ion, as well as the structure of the phosphonium or ammonium counterions, as shown in the Examples.

Although filters containing dyes according to the present invention provide a high and sufficient absorption of radiation at a wavelength around 685 nm, moreover providing excellent transmission of light emitted upon photostimulation of both BaFBr:Eu and CsBr:Eu type phosphors, there are two important aspects to be taken into account.

A first aspect is related with the "spectral purity" of the stimulating laser. Semiconductor lasers, however generating radiation to the highest extent in an extremely small wavelength range of about 10 nm, also emit light having a wavelength of about 590 nm. Although the intensity at 590 nm is very low, the optical density of the filter is not satisfactory at that wavelength. A solution therefore is offered by application of two optical filters, positioned in the vicinity of the laser. Quite a lot of combinations are possible in order to block undesired radiation emitted by that laser.

A second aspect is related with fluorescence of the selected organo transition metal dyes. For the organo cobalt dyes emission of fluorescent radiation has been detected in the wavelength range from 700 to 800 nm. In order to solve that problem an additional infrared filter should be installed. It has now experimentally been found that satisfying results were attained with commercially available filters as e.g. KG5® from Schott, and even more preferably BG39® from the same manufacturer, both having a thickness of 2 mm.

A system according to the present invention is further provided with means in order to convert detected energy into a signal representation of said radiation image, proceeding via an array of transducer elements.

Moreover in a preferred embodiment in the system according to the present invention, erasing light is emitted by an erasing light source assembly emitting in the wavelength range of 300 nm to 1500 nm. Even more preferred is a system wherein said light source has an electric power not exceeding an energy of 1 Joule per cm$^2$ of said phosphor screen, in order to reduce energy, in form of heat, and in order to make quick re-use possible.

In one embodiment it is recommended to make use of screens or panels provided with CsBr:Eu-type phosphors, whether in form of binderless needle-shaped phosphors, or, alternatively, in form of powder phosphor screens, comprising a binder medium.

Moreover it has been established that storage phosphor plates or panels coated with a BaFBr:Eu-type phosphor as e.g. binder coated BaF(I,Br):Eu or Ba(Sr)FBr:Eu phosphor layers as desired layers of a divalent europium activated alkaline earth metal halide phosphors, do not require change of filters and are processed after exposure in the same scanning unit without any problem. Other storage phosphors suitable for use in phosphor screens or plates are e.g. alkali metal phosphors, corresponding to the formula (I) hereinafter:

$$M^{1+}X.aM^{2+}X'_2bM^{3+}X''_3:cZ \qquad (I)$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leq a \leq 1$, $0 \leq b \leq 1$ and $0 < c \leq 0.2$. Such phosphors have been disclosed in, e.g., U.S. Pat. No. 5,736,069.

Divalent europium activated alkali halide type phosphor screens are preferred, wherein in said storage phosphors, a preferred halide is at least one of chloride, bromide and iodide or a combination thereof, and wherein, in an even more preferred embodiment, divalent europium activated cesium halide type phosphors are used, wherein said halide represents Br or a combination of Br and at least one of Cl and I, as a bromohalide phosphor.

In the system according to the present invention a divalent europium activated CsBr type phosphor is most preferably used.

Highly preferred phosphors present in the phosphor screen, panel or plate used in the system of the present invention are those phosphors, preferably prepared by a method comprising the steps of:

mixing said CsX with between $10^{-3}$ and 5 mol % of an Europium compound selected from the group consisting of EuX"$_2$, EuX"$_3$ and EuOX", X" being a member selected from the group consisting of F, Cl, Br and I, firing said mixture at a temperature above 450° C.

cooling said mixture and recovering the CsX:Eu phosphor.

Most preferably a CsBr:Eu stimulable phosphor is thus present in a storage phosphor panel in the system of the present invention, wherein said phosphor is most preferably prepared as disclosed by the method as disclosed in EP-A 1 203 394, with as preparation steps mixing said CsX with between $10^{-3}$ and 5 mol % of an Europium compound selected from the group consisting of EuX'$_2$, EuX'$_3$ and EuOX", X" being a member selected from the group consisting of F, Cl, Br and I, firing said mixture at a temperature above 450° C.

cooling said mixture and recovering the CsX:Eu phosphor.

Binderless screens can be prepared by bringing the finished phosphor on the support by any method selected from the group consisting of thermal vapor deposition, chemical or physical vapor deposition, electron beam deposition, radio frequency deposition and pulsed laser deposition, without however being limited thereto. It is also possible however to bring the alkali metal halide and the dopant together and depositing them both on the support in such a way that the alkali metal phosphor is doped during the manufacturing of the screen.

The method for manufacturing a binderless phosphor screen containing a CsX:Eu stimulable phosphor, wherein X represents Br or a combination of Br with a halide selected from the group consisting of Cl and I preferably comprises the steps of:
  bringing multiple containers of said CsX and an Europium compound selected from the group consisting of $EuX''_2$, $EuX''_3$ and $EuOX''$, $X''$ being a halide selected from the group consisting of F, Cl, Br and I in condition for vapor deposition and
  depositing, by a method selected from the group consisting of, thermal vapor deposition, chemical vapor deposition, electron beam deposition, radio frequency deposition and pulsed laser deposition, both said CsX and said Europium compound on a substrate in such a ratio that on said substrate a CsX phosphor, doped with between $10^{-3}$ and 5 mol % of Europium, is formed.

The deposition may proceed from a single container containing a mixture of the starting compounds in the desired proportions. Thus the method further encompasses a method for manufacturing a binderless phosphor screen containing a CsX:Eu-type stimulable phosphor, wherein X represents a halide selected from the group consisting of Br, Cl and I and combinations thereof comprising the steps of:
  mixing said CsX with between $10^{-3}$ and 5 mol % of an Europium compound selected from the group consisting of $EuX''_2$, $EuX''_3$ and $EuOX''$, $X''$ being a halide selected from the group consisting of F, Cl, Br and I;
  bringing said mixture in condition for vapor deposition and
  depositing said mixture on a substrate by a method selected from the group consisting of physical vapor deposition, thermal vapor deposition, chemical vapor deposition, electron beam deposition, radio frequency deposition and pulsed laser deposition.

As a particularly advantageous effect resulting from the system of the present invention, use of only one blue light transmitting filter is provided, for powdery binder containing screens, as well as for binderless phoshor screens as disclosed hereinbefore, wherein said phosphors may have a different composition as alkali metal halide or alkaline earth metal halide type phosphors. In the system of the present invention the need to make use of two scanners, each of them having a different filter, for those different stimulable phosphor types is thus avoided.

While the present invention will hereinafter be described in connection with preferred embodiments thereof, it will be understood that it is not intended to limit the invention to those embodiments.

EXAMPLES

I. Dye Synthesis.

The synthesis of organo transition metal dyes according to formula (I) proceeds by way of example, however not limited to, as described for Dye 1, Dye 2, Dye 69 and Dye 70.

I.1 Synthesis of Dye 1: Bis[benzyltributylphosphonium] tetrachlorocobaltate. Dye 1 has Been Prepared According to Scheme 1.

11.9 g (0.05 mole) of $CoCl_2$ hexahydrate was suspended in 400 ml of ethyl acetate. The suspension was azeotropically dried while being kept under a nitrogen atmosphere. The mixture water/ethyl acetate was removed with a Dean Stark separator. The volume of ethyl acetate was kept constant at 400 ml by adding additional amounts of ethyl acetate. The more water was removed, the more the color of the suspension was changing from red to blue. The water content of the portions ethyl acetate/water removed was determined (Karl Fischer) until the theoretical amount of water was removed. After one hour under reflux a suspension of 34.5 g of benzyl tributyl phosphonium chloride in ethyl acetate (200 ml) is added and reflux was continued for three more hours. During this time two 100 ml of ethyl acetate fractions were removed by destillation. After three hours a clear, deep blue oily phase separated from the reaction mixture. The reaction mixture was cooled to 50° C. and the ethyl acetate layer was removed. Residual ethyl acetate in the oil was removed under high vacuum in the temperature range from 50° C. to 60° C. 40 g of Dye 1 were obtained as a viscous deep blue oil.

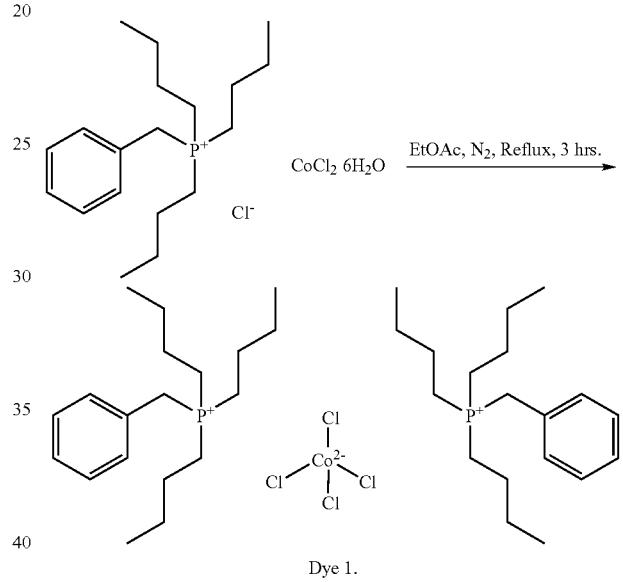

Scheme 1.

Dye 1.

I.2 Synthesis of Dye 2: Bis[cetyltributylphosphonium] dibromo dichloro cobaltate. Dye 2 has been Prepared According to Scheme 2.

11.9 g (0.05 mole) of $CoCl_2$ hexahydrate was suspended in 400 ml of ethyl acetate. The suspension was azeotropically dried while being kept under a nitrogen atmosphere. The mixture water/ethyl acetate was removed with a Dean Stark separator. The volume of ethyl acetate was kept constant at 400 ml by adding additional amounts of ethyl acetate. The more water was removed, the more the color of the suspension was changing from red to blue. The water content of the collected portions ethyl acetate/water was determined (Karl Fischer) until the theoretical amount of water was collected. After a refluxing time of two hours a solution of 53.2 g of cetyl tributyl phosphonium bromide in 200 ml of warm ethyl acetate was added. The resulting mixture was heated under reflux for two more hours while ethyl acetate was removed by destillation. A deep blue oil was obtained which is cooled to 50° C. Residual ethyl acetate in the oil was removed under high vacuum at a temperature in the range from 50° C. to 60° C. 57.8 g of Dye 2 were obtained as a deep blue oil.

Scheme 2.

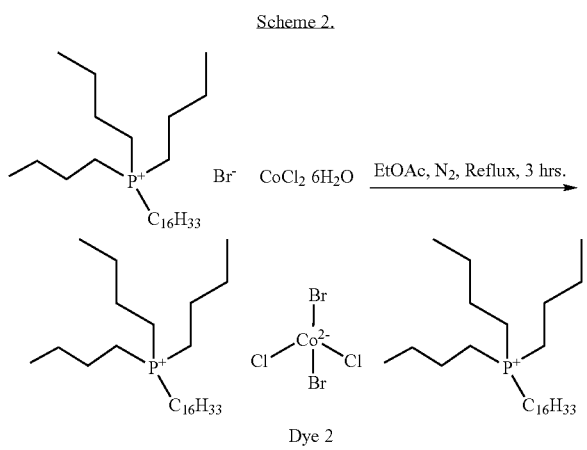

Dye 2

I.3 Synthesis of Dye 69

Bis(methyltrioctylammonium) tetrachlorocobaltate, (TOMA)$_2$CoCl$_4$. Dye 69 has Been Prepared According to Scheme 3.

11.9 g of (0,05 mole) CoCl$_2$ hexahydrate was suspended in 400 ml of ethyl acetate. The suspension was azeotropically dried while being kept under a nitrogen atmosphere. The mixture water/ethyl acetate was removed with a Dean Stark separator. The volume of ethyl acetate was being kept constant at 400 ml by adding additional amounts of ethyl acetate. The more water was removed, the more the color of the suspension was changing from red to blue. The water content of the portions ethyl acetate/water removed was determined (Karl Fischer) until the theoretical amount of water was collected.

After refluxing during one hour a solution of 44.5 g of methyltrioctylammonium chloride, being commercially available from Aldrich Chemical Company, Inc., USA, as Aliquat® 336 (a mixture of C$_8$ and C$_{10}$ chains with C$_8$ predominating), in ethyl acetate (200 ml) was added and refluxing was continued for three more hours. The resulting solution was cooled to room temperature, treated with activated charcoal for 1 hour, and filtered. Ethyl acetate was removed by destillation under reduced pressure. A deep blue oil was obtained which is cooled to 50° C. Residual ethyl acetate in the oil was removed under high vacuum in a temperature range between 50° C. and 60° C. 47 g of Dye 69 were obtained as a deep blue oil. The resulting deep blue oil was less viscous than Dye 70.

Scheme 3.

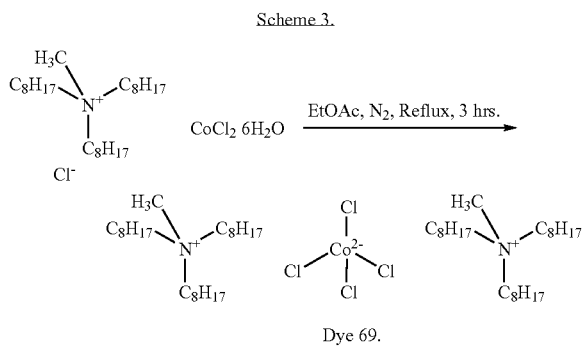

Dye 69.

I.4 Synthesis of Dye 70

Bis(methyltrioctylammonium) tetrabromocobaltate, (TOMA)$_2$CoBr$_4$ Dye 70 is Prepared According to Scheme 4 Hereinafter.

Anhydrous CoBr$_2$, (2.30 g; 0.01 mole) and methyltrioctylammonium bromide (TOMABr from Aldrich Chemical Company, Inc., USA) (9.73 g) were added to 200 ml of isopropanol and heated in order to reflux until all solids were dissolved (about 1 hour). The resulting solution was cooled to room temperature, treated with activated charcoal for 1 hour, and filtered. The solution was concentrated under reduced pressure and a deep blue oil was obtained which was cooled to 50° C. Residual solvent in the oil was removed under high vacuum at a temperature from 50° C. to 60° C.

11 g of Dye 70 were obtained as a viscous deep blue oil. Comparable results were obtained when making use of ethyl acetate as a solvent.

Scheme 4.

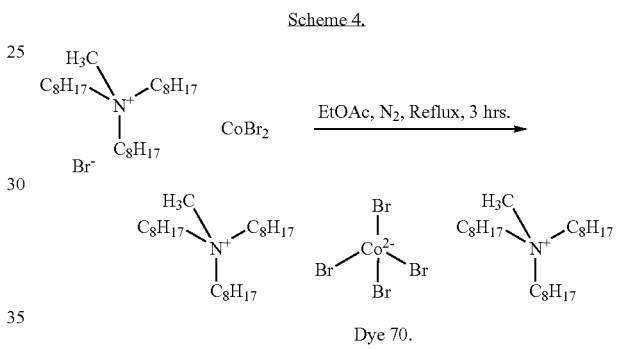

Dye 70.

Analoguous procedures can be used in order to prepare the other dyes mentioned in Table 1 and 2 hereinbefore.

I.5 Absorption and Transmission Spectra of Dye 1, Dye 2, Dye 69 and Dye 70

Figure 3A:
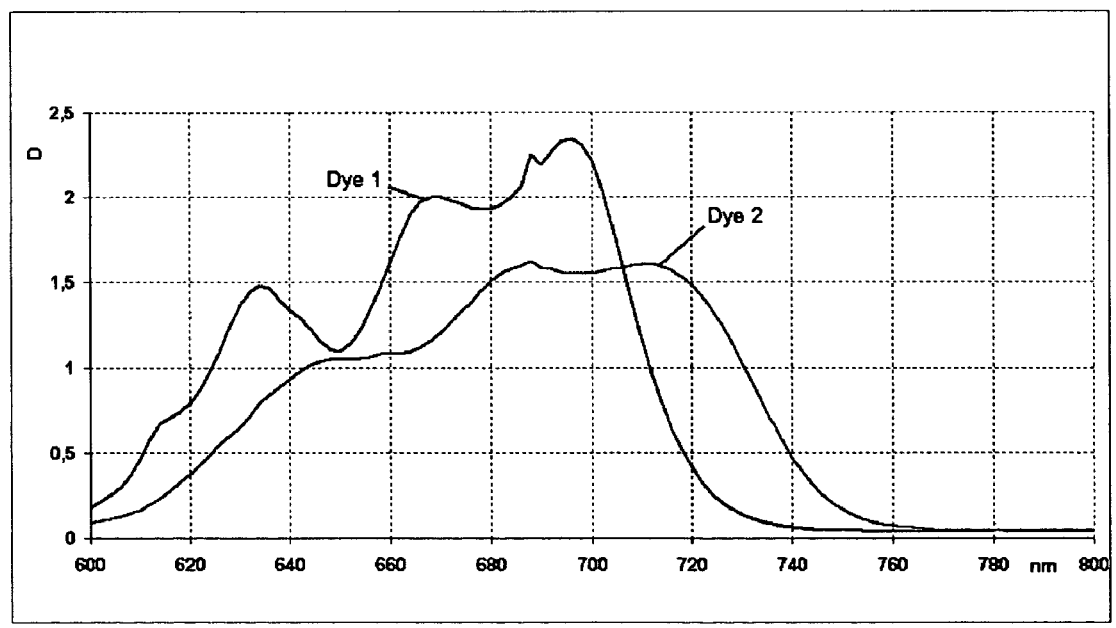
FIGS. 3A and 3B show the Absorption Spectrum and Transmission Spectrum of Dye 1 and of Dye 2, present as a thin film between two glass slides.

The Absorption Spectrum of Dye 1 and of Dye 2 (thin film between two glass slides) has been represented in FIG. 3A. It is concluded therefrom that for Dye 1 a high absorption density of at least 1.5 has been measured in the wavelength range from 660 to 705 nm. For Dye 2 the density of 1.5 is obtained in a more bathochromic range (from 680–720 nm).

Figure 3B:
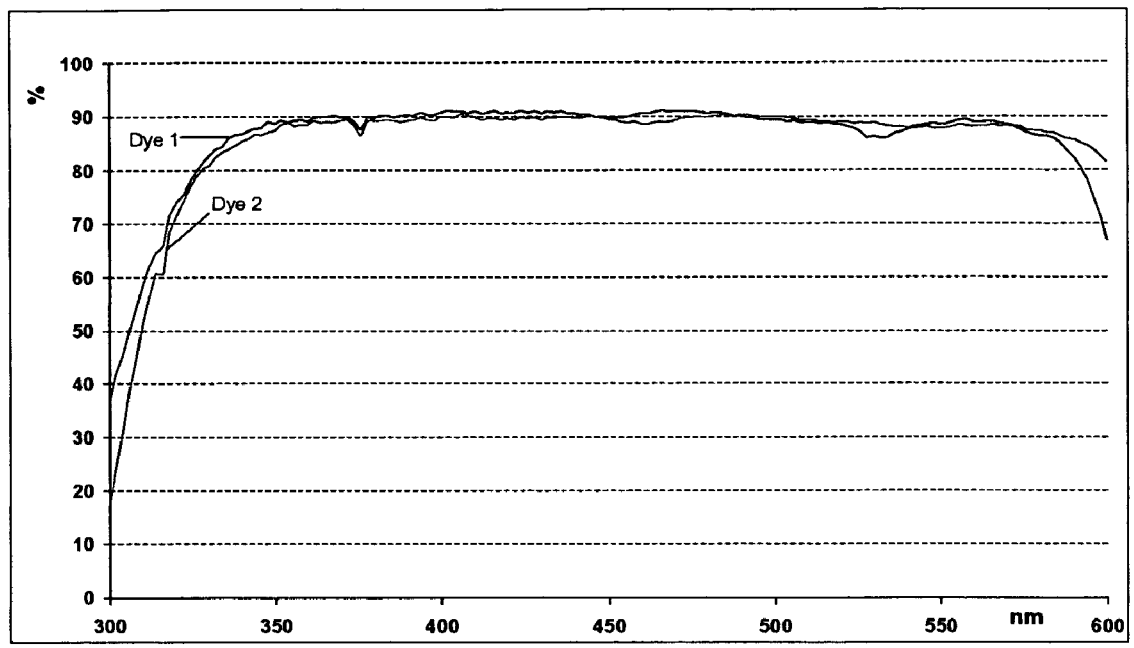

The Transmission Spectrum of Dye 1 and of Dye 2 (thin film between two glass slides) represented in FIG. 3B shows a particularly desired transmission of about 90% measured in the wavelength range from 350 to about 500 nm for both dyes.

Figure 4:
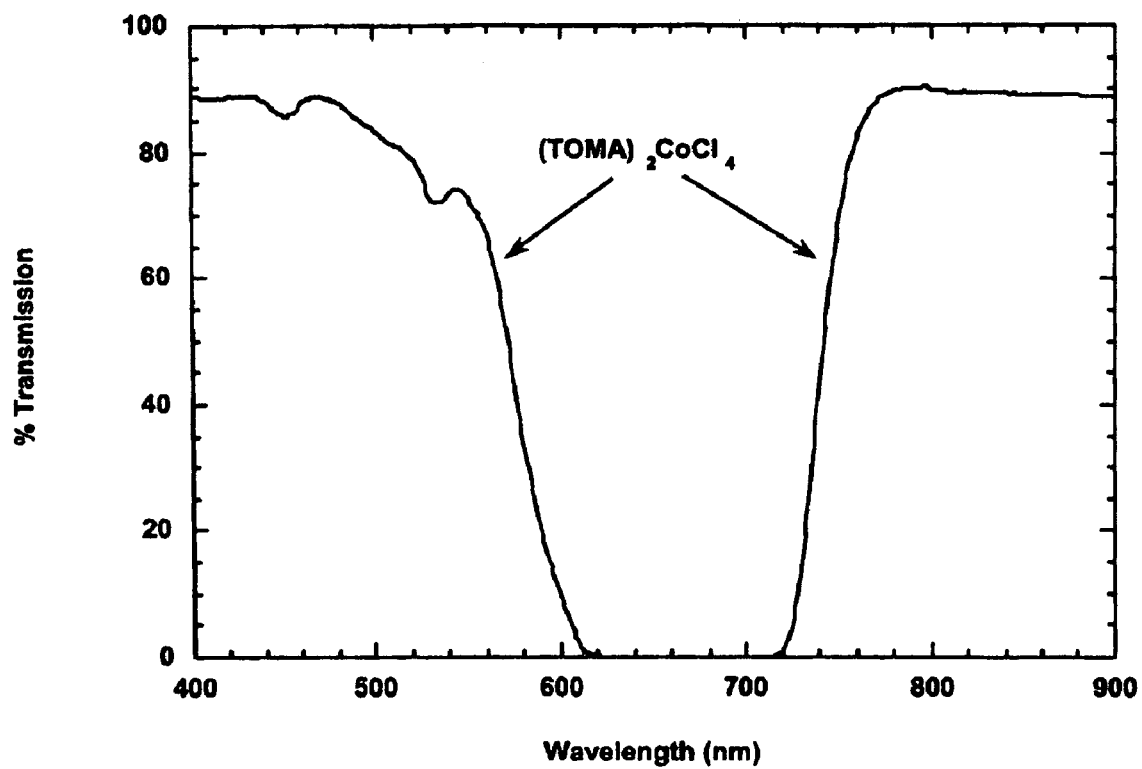
FIGS. 4A and 4B show the Transmission Spectrum of Dye 69 and of Dye 70, present as a thin film between two glass slides.
Figure 4:
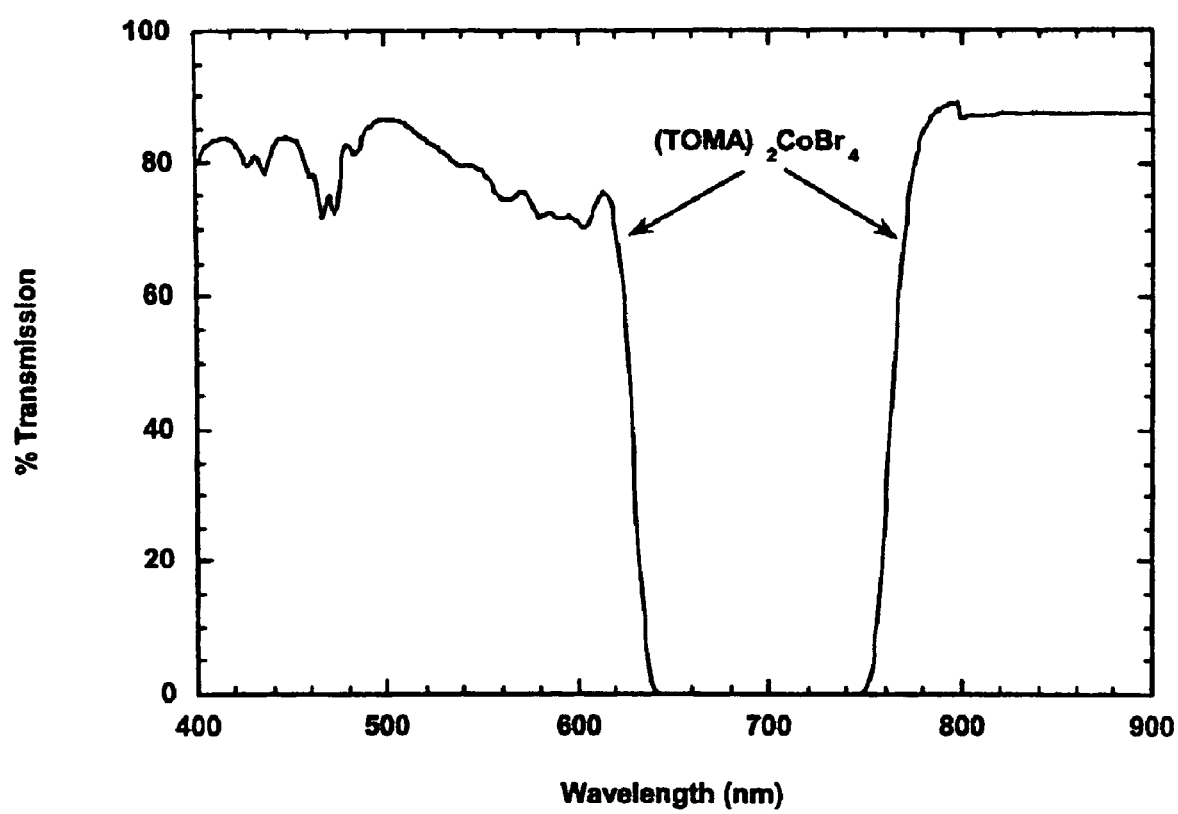

The Transmission Spectrum of Dye 69 (thin film between two glass slides) has been represented in FIG. 4A. It is concluded therefrom that a particularly desired transmission of at least 90% has been measured in the wavelength ranges below 500 nm and above 800 nm.

The Transmission Spectrum of Dye 70 (thin film between two glass slides) represented in FIG. 4B shows a transmission of about 80% measured in the wavelength range below 500 nm and a transmission of more than 80% has been measured in the wavelength range above 800 nm.

II. Storage Phosphor Screens or Panels.

II.1. Inventive Panel Coated with Ba(Sr)FBr:Eu Phosphor Plates

Phosphor Layer Composition:

| | |
|---|---|
| BAEROSTAB M36 (from Bärlöcher GmbH) | 1.5 g |
| DISPERSE AYD 9100 (from Daniel Produkts Company) | 0.75 g |
| KRATON FG19101X (from Shell Chemicals) | 12.5 g |
| Ba(Sr)FBr: Eu (mean particle size: 7 µm) | 270 g |
| Ba(Sr)FBr: Eu (mean particle size: 3 µm) | 30 g |

Preparation of the Phosphor Laquer Composition:

BAEROSTAB M36, DISPERSE AYD 9100 and KRATON FG19101X were dissolved while stirring in the prescribed amounts in 61.5 g of a solvent mixture from wash benzine 100–120, toluene and butyl acrylate in ratios by volume of 50:30:20. The phosphors were added thereafter and stirring was further proceeded for another 10 minutes at a rate of 1700 r.p.m.

The composition was doctor blade coated at a coating rate of 2.5 m per minute onto a subbed 175 µm thick polyethylene terephthalate support and dried at room temperature during 30 minutes. In order to remove volatile solvents as much as possible the coated phosphor plate was dried at 90° C. in a drying stove.

II.2. Inventive Panel Coated with Binderless, Needle-Shaped CsBr:Eu Phosphor Plates CsBr:Eu screens were made via thermal vapor deposition of CsBr and EuOBr. Therefore CsBr was mixed with EuOBr and placed in a container in a vacuum deposition chamber. The CsBr:Eu phosphor was prepared by the method comprising the steps of:

- mixing said CsBr with between $10^{-3}$ and 5 mol % of EuOBr and bringing said mixture in condition for vapor deposition;
- firing said mixture at a temperature above 450° C. and depositing said mixture on the support by the method of physical vapor deposition;
- cooling said mixture.

More particularly the container with starting materials was heated to a temperature of 750° C. and the phosphor was deposited on a glass disk with a thickness of 1.5 mm and a diameter of 40 mm. The distance between the container and the substrate was 10 cm. During evaporation, the substrate was rotated at 12 r.p.m. Before the start of the evaporation, the chamber was evacuated to a pressure of 4.10 mbar and during the evaporation process, Ar was introduced in the chamber. The Eu-concentration in the evaporated screens was measured with X-ray fluorescence and was of the order of 800 ppm. Deposited needles had a length of about 750 µm (average length) and a diameter of about 4 µm (average diameter).

II.3. Inventive Panel Coated with Powdery CsBr:Eu Phosphor Plates

In radiographic applications wherein a lower sensitivity is desired, needle-shaped phosphors with smaller needles are more efficient, moreover from a point of view of enhanced image quality (as sharpness, especially desired in e.g. mammographic applications).

So from the needle-shaped CsBr:Eu phosphors deposited as in Inventive Panel B, needles were scraped off and ground in order to get needles having a length of about 250 µm instead of 750 µm as an average length. The same phosphor layer and lacquer composition was taken as in comparative phosphor layer A hereinbefore, in order to get about the same doctor blade coating, except for the phosphor used therein.

II.4. Inventive Panel Coated with Powdery CsBr:Eu Phosphor Plates

Just as in Inventive panel C, the binderless phosphor needles were ground, but a binderless layer was obtained by melting them on the same support as in panel C. A homogeneous layer was thereby obtained.

II.5. Inventive Layer from a Melt Having CsBr:Eu Phosphor Composition

In an aluminum oxide crucible, the depth of which was decreased in order to mount it in a scanning apparatus afterwards, 0.5 grams of CsBr:Eu phosphor were put in an oven. In order to avoid contamination nitrogen was flushed throughout the environment while heating the phosphor material in the crucible very slowly, up to a temperature exceeding the melting temperature of 760° C. with at most 10° C. Once the phosphor was in a molten aggregation state, a thin liquid, perfectly spread layer was formed on the bottom of the crucible. Then the solidifying process was started by cooling the crucible at a rate of 2° C. per minute and a layer the melt was formed, having a CsBr:Eu composition.

III. Filters Provided in the Scanning Apparatus.

1. Inventive Filter with Dye 69.

A Schott BG39® filter having a thickness of 1 mm was coated with 4 layers of Dye 69. The 4 layers thereof were consecutively applied thereupon. Moreover it was established that the filter for the laser (KG5 from Schott) was not required in the arrangement of the system. It was not possible to detect any laser radiation passing the filter combination as set forth, when making use therefore of a Photonic Multi-Channel analyser PMA-11 from HAMAMATSU, Japan. This result is illustrative for the suitable absorption, by a Schott BG39® filter with a thickness of 1 mm, within the wavelength range from 700 nm to 800 nm.

Determination of the optical density was possible with the S370 Radiometer from UDT: a power of 0.03 nW could, after correction for the dark current, still be measured. The power of the laser source was 12 mW and the optical density was even 8.6. Moreover the spectral purity was enhanced by installation of an additional OG590® filter, having a thickness of 14 mm, whereas no KG5® filter is required anymore.

Transmission of the filter combination was determined with a Yasco® spectrophotometer: results obtained by measurement of the emission spectrum of both phosphor types, once with, and once without the filter mentioned above has been illustrated in the Table 3 hereinafter, after calculation of the convolution thereof. As a reference filter, a filter based on colored glass, coated with dielectric layers was taken.

TABLE 3

| Phosphor | Transmission BG39 ®_1 mm + 4 layers Dye 69 | Transmission of reference filter |
|---|---|---|
| BaFBr: Eu (II.1) | 71.3% | 67.6% |
| CsBr: Eu (II.2) | 63.6% | 37.9% |

From Table 3 it is clear that for both types of filters there is a far lower difference in transmission percentage, if compared with the results obtained with dielectric filters and that the transmission exceeds the transmission of the comparative dielectric filter based on coloured glass, coated with dielectric layers.

2. Combination of Co-Salt Filters with Dielectric Filter Layers

Determining transmission and optical density of the colored glass filter, coated with dielectric layers, revealed that, in the wavelength range from 300 to 500 nm, only for the BaFBr:Eu-type phosphor a satisfying transmission was measured while opposite thereto for the CsBr:Eu-type phosphor transmission already decreases at 445 nm.

Otherwise in the wavelength range from 500 to 800 nm loss of density from 730 nm on was found and fluorescence of the dye was not absorbed well.

5 glass plates, coated with dielectric layers, were further coated with Dye 69, used in the experiments set forth hereinbefore: in one experiment 3 dye layers were applied, while in a second experiment 5 dye layers were applied.

The Photonic Multi-Channel Analyser PMA-11 from HAMAMATSU, Japan, was used to determine the wavelengths of the light passing the filter combination. All curves were normalized in order to set the maximum value in the spectra at a value of 1. Narrow bands passing the filter compositions set forth were detected at 750 nm for the tests with 5 dye layers, and in some cases a narrow band was even detected at 800 nm. For all of the filter combinations a peak at 610 nm was still appearing.

Determination of the optical density for the filter combinations was performed with a setup wherein the S370 Radiometer from UDT was used. Tests were made with BG39® filters having a thickness of 1 mm and 0.5 mm respectively. The optical density was limited to 6.4 when the filter having a thickness of 0.5 mm was used. Fluorescence at 750 nm was still measured. The filter having a thickness of 1 mm showed an optical density, depending on the amount of dye used, and provided complete absorption of fluorescence.

A method wherein use was made of a thicker layer of the dye so that the filter could be produced making use of only one layer of the dye of 200 µm thick, one microscopic slide (1 mm, normal glass) and a 1 mm filter BG39® in combination. This resulted in a filter having a total thickness of 2.2 mm, comparable with the one made of thin layers, having a total thickness of 2.5 mm. As an alternative the dye layer having a thickness of 200 µm was coated between two BG39® filters of 0.5 mm each, resulting in filter B having a total thickness of 1.2 mm.

Dye layer arrangement A indicated as Filter A in the Table 4 hereinafter thus represents an arrangement of BG39®-filters having a thickness of 0.5 mm each, situated at both sides of a dye layer, sandwiched inbetween and having a thickness of 100 µm.

Dye layer arrangement B indicated as Filter B in the Table 4 hereinafter thus represents an arrangement of one BG39®-filter having a thickness of 1 mm at one side of the dye layer having a thickness of 100 µm and a colorless glass having a thickness of 1 mm.

Optical densities determined as in the former experiment were 6.4 for filter A and 8.1 for filter B.

Transmissions were measured with the YASCO® spectrofluorometer. The transmission for both phosphor types was shown to be better for filter B as shown in the results summarized in the Table 4.

TABLE 4

|  | Reference | Filter A | Filter B |
|---|---|---|---|
| BaFBr: Eu (II.1) | 64.0% | 71.6% | 76.5% |
| CsBr: Eu (II.2) | 31.6% | 75.3% | 80.6% |

From Table 4 it is clear that for both types of filters there is only a minor difference in transmission percentage again, if compared with the results obtained with reference colored glass+dielectric layer filter and that the transmission clearly exceeds the transmission of the comparative filter.

For all of those panels II. 1–II.5 an X-ray exposure having an energy of 80 kvp and 35 kvp was applied (thus an energy in the preferred range from 25 up to 150 kvp). The stored energy was read out in a scanner made up with a diode laser (685 nm) provided with a red filter having a maximum transmission at the same wavelength. The beam of the 30 mW red diode laser was focussed to a small spot of 100 µm and the blue stimulated light was filtered with a blue filter containing an organo-cobalt dye pigment having a maximum transmission in the desired wavelength range from 390 nm up to 450 nm.

According to the system of the present invention it has thus been shown that each of the panels, whether in form of binderless needles or ground needles coated in a binder material layer, whether in form of a melt of main components or a melt of (ground) needles, when scanned and read out one after another in an at random order there is no need to change the blue light transmitting filter used. Accordingly ability to make use of only one scanner should be considered as being remarkably interesting and desired, more particularly from a point of view of investment.

3. Inventive Filter with Dye 1 (tetrachlorocobaltate salt) or Dye 2 (dichlorodibromocobaltate salt).

A Schott BG39® filter having a thickness of 1 mm was coated with dye layers of both dyes, dye 1 and dye 2, having different thicknesses (100 µm and 150 µm thick respectively). It was not possible to detect any laser radiation passing the filter combination as set forth, when making use therefore of the Photonic Multi-Channel analyser PMA-11 from HAMAMATSU, Japan. This result is illustrative for the suitable absorption, by a Schott BG39 tetrachloro- and dibromodichlorocobaltate filter with a thickness of 1 mm, within the wavelength range from 700 nm to 800 nm.

Determination of the optical density was possible with the S370 Radiometer from UDT: a power (expressed in nW) as indicated in the Table 5 hereinafter, after correction for the dark current, could still be measured for a power of the laser source of 12 mW. Optical densities measured were also summarized in the Table hereinafter.

TABLE 5

| Filter combination | Power measured after transmission (nW) | Optical Density |
|---|---|---|
| BG39 ®_1 mm + dye 1_100 µm | 2.4 | 6.70 |
| BG39 ®_1 mm + dye 1_150 µm | 0.24 | 7.70 |
| BG39 ®_1 mm + dye 2_100 µm | 18.0 | 5.82 |
| BG39 ®_1 mm + dye 2_150 µm | 0.41 | 7.47 |

From Table 5 it becomes clear that for all dye filters there is a remarkably reduced power measured after transmission of the 150 µm dye layers and a comparably high optical density.

4. Further Combinations of Co-Salt Filters with Dielectric Filter Layers

Figure 2:
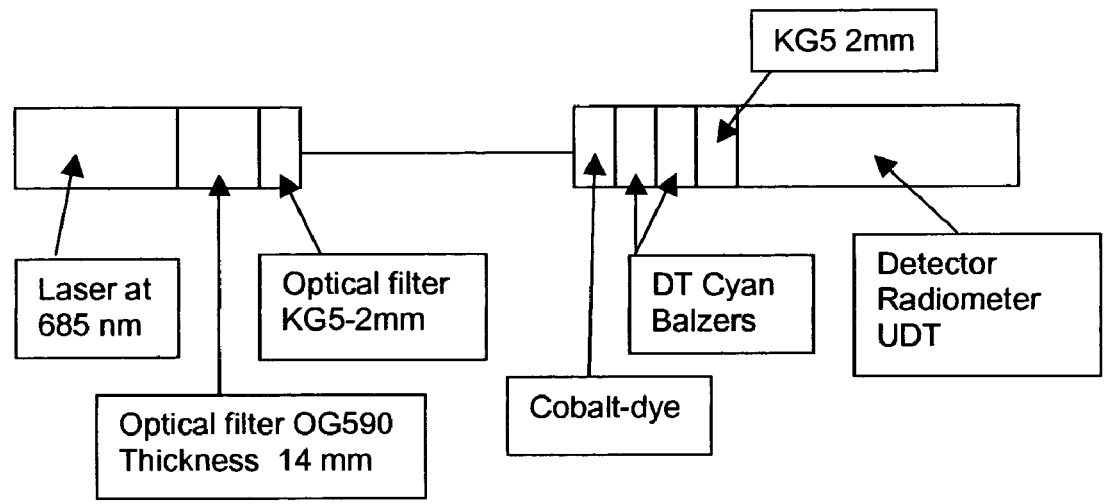
FIG. 2 shows an inventive set up wherein a combination of filters is used, one of which is a filter comprising a cobalt dye, wherein detection of radiation emitted upon stimulation proceeds by the radiometer detector.

In the further arrangement as set forth in FIG. 2 B a very thick filter of OG590® was installed by making use of 7 filters of 2 mm thick each. After implementing an optical filter OG590® of 14 mm the peak at 590 nm in the spectrum of the laser disappeared. The resulting power of the laser was still 4.2 mW. Doubling the filter with dielectric layers (two filters DT Cyan) was further performed with only a weak effect. Combination of "enhanced optical purity" and "absorbed fluorescence" by means of a DT Cyan-filter and a filter KG5-2 mm at the detector side was leading to an optical density of 8.3. The spectrum of the light passing the filter combination with the Photonic Multi-Channel analyser PMA-11 from HAMAMATSU, Japan, revealed that only a small peak at 685 nm was found, which was attenuated by adding a second filter DT Cyan from Balzers.

Further experiments related with a filter BG39® 2mm-filter with a dielectric coating (A+B) were performed, wherein for the measurements with the combination the dielectric layer was placed between the phosphor and the colored glass filter.

Calculating the transmission as hereinbefore for both phosphor types for the different filter components following results were obtained as summarized in Table 6.

TABLE 6

| Filter | Dielectric layer (A + B) | BG39 ®_2 mm | Combination of (A + B) + BG39 ®_2 mm |
|---|---|---|---|
| BaFBr: Eu-type | 90.7% | 66.6% | 61.5% |
| CsBr: Eu-type | 81.6% | 77.6% | 64.3% |

Results in a transmission of 80% for CsBr:Eu with Co-dye Dye 69 are preferred.

From the experiments as set out hereinbefore it was further learnt that the thickness of the filter should preferably be less than 2.5 mm, but, for reason of stability, the thickness should not be less than 2.0 mm, with variations in thickness thereof of less than 90 μm. Those variations in thickness seem not to be critical in the middle of the filter. The refraction index of the dye should be as close as possible to that of the glass of the BG39® glass filter and should be constant within a certain range.

The thermal expansion coefficient of the gel has to be watched in a temperature range from −25° C. to +55° C., taking into account that the thermal expansion coefficient of BG39® is $9*10^{-6}/°$ K, whereas for normal glass it is $6*10^{-6}/°$ K. A normal glass with the same thermal expansion coefficient as BG39® is envisaged.

Measurements of the spectrum of a filter without dye (only with BG39® (2 mm and 2*2 mm))) were performed to look at the wavelengths between 550 nm and 620 nm. The filter was said to be most interesting for use with a laser at 660 nm, not at 685 nm, as powder and needle image phosphors could both be stimulated with 660 nm. Needle image plates in fact advantageously make use of stimulation with a 660 nm laser since this phosphor needs a lower intensity of the laser. The difficulty to find a laser at 685 nm with enough power for stimulation of powder image plates was solved by making use of a filter in combination with the laser diode at 660 nm.

Nevertheless a prototype with a BG39® in combination with a dye filter was suitable for use, although the filter BG39® was absorbing to a quite lesser extent at this wavelength and although the absorption of the dye was somewhat less, because the absorption of the dye as such was very high and still sufficient at 660 nm. As a result it was not required to increase the thickness of the layer of the dye. Moreover the fluorescence spectrum of the dye was the same when excited and independent on the wavelength of 660 nm or 685 nm. As a result elimination of the fluorescence signal by making use of BG39®_1.5 mm was performed in an unchanged way.

The spectral impurity that was found with the laser at 660 nm was further identical with the one found at 685 nm. Making use of a filter RG645®_2 mm was eliminating all wavelengths in the range from 550 nm to 620 nm.

By adding a filter RG645®_2 mm just behind the laser, the peak appearing as a result of spectral impurity within the range between 550 nm and 620 nm completely disappeared. Only a signal due to the fluoresence of the dye was detected by the spectrophotometer as a band in the wavelength range between 720 nm and 760 nm.

The optical density was measured with the radiometer: filter RG645® was installed behind the laser and the intensity of the light was measured, once with and once without the prototype. Even without filter BG39®_0.5 mm an optical density of 7.60 was measured, comparable with the optical density that was reached at the wavelength of 685 nm.

From these experiments it could be concluded that prototype filters made with the dye 69 were suitable for use with a laser at a wavelength of 660 nm. No changes were required with respect to the design of the filter to make it suitable for use at a wavelength of 660 nm. As a result the filter was suitable for use in combination with CsBr:Eu-type phosphor for needle image plates, as well as for the BaFBr:Eu-type phosphor powder image plates, resulting in the particularly advantageous effect to make use of only one scanner for those different types of image plates.

Having described in detail preferred embodiments of the current invention, it will now be apparent to those skilled in the art that numerous modifications can be made therein without departing from the scope of the invention as defined in the appending claims.

What is claimed is:

1. A system for reading out stimulable phosphor screens, plates or panels, after exposing said screens to X-rays, the phosphors of which are coated on a substrate in a phosphor layer, said system comprising at least one source of stimulating radiation, an array of transducer elements arranged for detecting light emitted upon stimulation and for converting said light into a signal representation of said image, and filtering means for preventing light emitted by said source of stimulation light from being detected by said transducer elements, characterized in that a ratio of transmission at the stimulating emission wavelength of said source of stimulation light and transmission of stimulated light in the wavelength range between 350 nm and 500 nm is less than $10^{-6}$, wherein said ratio is defined by the formula (1):

$$Tr(\lambda_{st}(nm))/Tr(\lambda_x(nm))<10^{-6} \quad (1)$$

wherein $\lambda_{st}$ is the stimulation wavelength and wherein 350 nm $<\lambda_x=500$ nm wherein said filtering means comprises at least one organo transition metal dye, wherein said organo transition metal dye is present as a viscous deep blue oil.

2. A system according to claim 1 wherein said transducer elements for detecting light emitted upon stimulation and for converting said light into a signal representation of said image, are charge-coupled devices.

3. System according to claim 2, wherein said viscous deep blue oil is embedded in a UV-cured matrix.

4. System according to claim 1, wherein said organo transition metal dye is a compound according to the general formula (I)

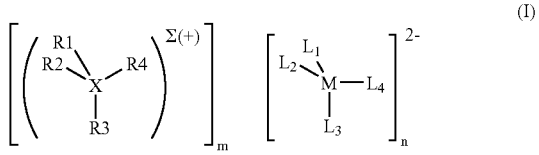
(I)

wherein n≧1, m≧1, Σ(+) ≧1,
wherein −2n=mΣ(+),
wherein X=N or P,
wherein M=Co or Ni,
wherein $R^1$, $R^2$, $R^3$ and $R^4$ are the same or different and each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another, and wherein $L^1$, $L^2$, $L^3$ and $L^4$ each independently represents one of F, Cl, Br and I, and when m=1, then Σ(+)=2n and consequently 2n positively charged centers are present in the cation, and when n=1 and Σ(+)=1, then m=2 and consequently two cations $(X^+R^1R^2R^3R^4)$ and $(X^+R^5R^6R^7R^8)$ are present in the molecule, wherein $R^5$, $R^6$, $R^7$, $R^8$ are the same or different and each independently represents an alkyl group, an aliphatic group, an alicyclic hydrocarbon group, an aromatic group, a heteroaromatic group, a hyperbranched polymer group, a dendrimeric group or $R^5$, $R^6$, $R^7$ and $R^8$ each independently represents the necessary atoms to form a ring system with one another.

5. System according to claim 4, wherein said viscous deep blue oil is embedded in a UV-cured matrix.

6. System according to claim 1, wherein said viscous deep blue oil is applied between colored or non-colored glass plates or plastic foils.

7. System according to claim 6, wherein said viscous deep blue oil is embedded in a UV-cured matrix.

8. System according to claim 6, wherein said viscous oil further comprises a compound according to the formula $(R^1R^2R^3R^4)$ $P^+X^-$ and $(R^1R^2R^3R^4)$ $N^+X^-$, wherein $R^1$, $R^2$, $R^3$ and $R^4$ are the same or different and wherein each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another and wherein $X^-$ represents one of F, Cl, Br and I.

9. System according to claim 1, wherein said viscous deep blue oil is applied between colored or non-colored glass plates or plastic foils.

10. System according to claim 9, wherein said viscous deep blue oil is embedded in a UV-cured matrix.

11. System according to claim 1, wherein said viscous deep blue oil is embedded in a UV-cured matrix.

12. System according to claim 11, wherein said viscous oil further comprises a compound according to the formula $(R^1R^2R^3R^4)$ $P^+X^-$ and $(R^1R^2R^3R^4)N^+X^-$, wherein $R^1$, $R^2$, $R^3$ and $R^4$ are the same or different and wherein each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another and wherein $X^-$ represents one of F, Cl, Br and I.

13. System according to claim 1, wherein said viscous oil further comprises a compound according to the formula $(R^1R^2R^3R^4)$ $P^+X^-$ and $(R^1R^2R^3R^4)$ $N^+X^-$, wherein $R^1$, $R^2$, $R^3$ and $R^4$ are the same or different and wherein each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another and wherein $X^-$ represents one of F, Cl, Br and I.

14. System according to claim 1, wherein said filtering means is further provided with at least one dielectric filter layer.

15. System according to claim 1, wherein a colored filter is installed between said stimulating radiation source and phosphor panels in order to provide spectrally pure stimulation.

16. System according to claim 15, wherein said colored filter is a glass filter selected from the group of Schott® filters of the type OG590, RG610, RG630, RG645, RG665, KG1, KG2, KG3, KG4 and KG5.

17. System according to claim 1, wherein an optical filter is installed between filtering means and transducer elements in order to provide absorption of infrared fluorescence of said organo transition metal dye.

18. System according to claims 17, wherein said optical filter is a glass filter selected from the group of Schott® filters of the type KG1, KG2, KG3, KG4, KG5, BG18, BG38, BG39 and BG40.

19. System according to claim 1, wherein said stimulable phosphor screens comprise a divalent europium activated CsX-type phosphor, wherein said X represents Br or a combination of Br with at least one of Cl and I.

20. System according to claim 1, wherein said stimulable phosphor screens comprise a $(Ba,M^{II})FX':Eu$ type phosphor, wherein $M^{II}$ is an alkaline earth metal and wherein X' represents Br or a combination of Br with at least one of Cl and I.

21. A system for reading out stimulable phosphor screens, plates or panels, after exposing said screens to X-rays, the phosphors of which are coated on a substrate in a phosphor layer, said system comprising at least one source of stimulating radiation, an array of transducer elements arranged for detecting light emitted upon stimulation and for converting said light into a signal representation of said image, and filtering means for preventing light emitted by said source of stimulation light from being detected by said transducer elements, characterized in that a ratio of transmission at the stimulating emission wavelength of said source of stimulation light and transmission of stimulated light in the wavelength range between 350 nm and 500 nm is less than $10^{-6}$, wherein said ratio is defined by the formula (1):

$$Tr(\lambda_{st}(nm))/Tr(\lambda_x(nm))<10^{-6} \qquad (1)$$

wherein $\lambda_{st}$ is the stimulation wavelength and wherein 350 nm $<\lambda_x<$ 500 nm wherein said transducer elements for detecting light emitted upon stimulation and for converting said light into a signal representation of said image, are charge-coupled devices further comprising organo transition metal dye is present as a viscous deep blue oil.

22. System according to claim 21, wherein said organo transition metal dye is a compound according to the general formula (I)

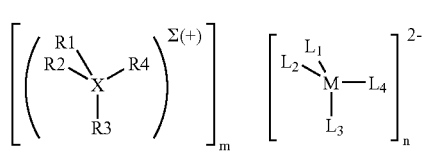

wherein $n \geq 1$, $m \geq 1$, $\Sigma(+) \geq 1$,
wherein $-2n = m \Sigma(+)$,
wherein X=N or P,
wherein M=Co or Ni,
wherein $R^1$, $R^2$, $R^3$ and $R^4$ are the same or different and each independently represents an alkyl group, an aliphatic group, an alicyclic hydrocarbon group, an aromatic group, a heteroaromatic group, a hyperbranched polymer group, a dendrimeric group or $R^1$, $R^2$, $R^3$ and $R^4$ each independently represents the necessary atoms to form a ring system with one another, and wherein $L^1$, $L^2$, $L^3$ and $L^4$ each independently represents one of F, Cl, Br and I, and
when m=1, then $\Sigma(+)=2n$ and consequently 2n positively charged centers are present in the cation, and when n=1 and $\Sigma(+)=1$, then m=2 and consequently two cations $(X^+R^1R^2R^3R^4)$ and $(X^+R^5R^6R^7R^8)$ are present in the molecule, wherein $R^5$, $R^6$, $R^7$, $R^8$ are the same or different and each independently represents an alkyl group, an aliphatic group, an alicyclic hydrocarbon group, an aromatic group, a heteroaromatic group, a hyperbranched polymer group, a dendrimeric group or $R^5$, $R^6$, $R^7$ and $R^8$ each independently represents the necessary atoms to form a ring system with one another.

23. System according to claim 21, wherein said viscous deep blue oil is applied between colored or non-colored glass plates or plastic foils.

24. System according to claim 23, wherein said viscous deep blue oil is embedded in a UV-cured matrix.

25. System according to claim 21, wherein said viscous deep blue oil is applied between colored or non-colored glass plates or plastic foils.

26. System according to claim 25, wherein said viscous deep blue oil is embedded in a UV-cured matrix.

27. System according to claim 21, wherein said viscous deep blue oil is embedded in a UV-cured matrix.

28. System according to claim 21, wherein an optical filter is installed between stimulable phosphor panels and filtering means in order to reduce the excitation of infrared fluorescence of said organo transition metal dye by stimulation light reflected by the phosphor panel.

29. System according to claims 28, wherein said optical filter is a glass filter selected from the group of Schott® filters of the type KG1, KG2, KG3, KG4, KG5, BG18, BG38, BG39 and BG40.

30. A system for reading out stimulable phosphor screens, plates or panels, after exposing said screens to X-rays, the phosphors of which are coated on a substrate in a phosphor layer, said system comprising at least one source of stimulating radiation, an array of transducer elements arranged for detecting light emitted upon stimulation and for converting said light into a signal representation of said image, and filtering means for preventing light emitted by said source of stimulation light from being detected by said transducer elements, characterized in that a ratio of transmission at the stimulating emission wavelength of said source of stimulation light and transmission of stimulated light in the wavelength range between 350 nm and 500 nm is less than $10^{-6}$, wherein said ratio is defined by the formula (1):

$$Tr(\lambda_{st}(nm))/Tr(\lambda_x(nm)) < 10^{-6} \qquad (1)$$

wherein $\lambda_{st}$ is the stimulation wavelength and wherein 350 nm $<\lambda_x<$ 500 nm wherein each of said phosphor screens is consecutively subjected to following steps:
1) Stimulating said stimulable phosphor screen with stimulation light,
2) detecting stimulated emission light, emitted by said phosphor screen upon stimulation;
3) converting detected light signal into a digital representation of a radiation image;
4) erasing said phosphor screen by exposing it to erasing energy;
wherein differences in maximum absorption wavelength of stimula-tion spectra of each of said screens are in the range from 10 nm up to 100 nm, wherein differences in maximum emission of stimulated emission spectra of said screens are in the range from 10 nm up to 150 nm, and wherein filtering means are provided for preventing stimulation radiation from being detected by detecting means, and for transmitting radiation emitted upon stimulation.

31. System according to claim 30, wherein the difference in transmission by the filtering means of light emitted upon stimulation by the different phosphor screens is not more than 10%.

32. A system for reading out stimulable phosphor screens, plates or panels, after exposing said screens to X-rays, the phosphors of which are coated on a substrate in a phosphor layer, said system comprising at least one source of stimulating radiation, an array of transducer elements arranged for detecting light emitted upon stimulation and for converting said light into a signal representation of said image, and filtering means for preventing light emitted by said source of stimulation light from being detected by said transducer elements, characterized in that a ratio of transmission at the stimulating emission wavelength of said source of stimulation light and transmission of stimulated light in the wavelength range between 350 nm and 500 nm is less than $10^{-6}$, wherein said ratio is defined by the formula (1):

$$Tr(\lambda_{st}(nm))/Tr(\lambda_x(nm)) < 10^{-6} \qquad (1)$$

wherein $\lambda_{st}$ is the stimulation wavelength and wherein 350 nm $<\lambda_x<$ 500 nm wherein said stimulable phosphor screens are selected from the group consisting of binder layer containing screens and binderless phosphor layer screens.

33. System according to claim 32, wherein said binderless phosphor layer screen is provided with needle-shaped phosphors, having phosphor needles, aligned in parallel, under an angle in a range between 60° and 90° verus said substrate.

34. System according to claim 33, wherein said binderless phosphor layer screen comprises said phosphor in a homogeneously solidified form.

35. System according to claim 34, wherein said binder layer containing phosphor screen comprises a ground needle-shaped phosphor in non-aligned powdery form.

* * * * *